(12) United States Patent
Dietle

(10) Patent No.: US 11,668,399 B2
(45) Date of Patent: Jun. 6, 2023

(54) ROTARY SEAL AND METHOD OF MAKING SAME

(71) Applicant: KALSI ENGINEERING, INC., Sugar Land, TX (US)

(72) Inventor: Lannie L. Dietle, Annapolis, MD (US)

(73) Assignee: KALSI ENGINEERING, INC., Sugar Land, TX (US)

(*) Notice: Subject to any disclaimer, the term of this patent is extended or adjusted under 35 U.S.C. 154(b) by 908 days.

(21) Appl. No.: 16/407,946

(22) Filed: May 9, 2019

(65) Prior Publication Data

US 2019/0353252 A1 Nov. 21, 2019

Related U.S. Application Data

(60) Provisional application No. 62/762,703, filed on May 15, 2018.

(51) Int. Cl.
| | |
|---|---|
| *F16J 15/54* | (2006.01) |
| *B29C 43/18* | (2006.01) |
| *F16C 33/80* | (2006.01) |
| *F16J 15/3208* | (2016.01) |
| *F16J 15/328* | (2016.01) |
| *B29C 33/42* | (2006.01) |
| *B29C 33/76* | (2006.01) |

(52) U.S. Cl.
CPC ............ *F16J 15/54* (2013.01); *B29C 33/42* (2013.01); *B29C 33/76* (2013.01); *B29C 43/18* (2013.01); *F16C 33/805* (2013.01); *F16J 15/3208* (2013.01); *F16J 15/328* (2013.01)

(58) Field of Classification Search
CPC ......... B29C 33/14; B29C 33/16; B29C 33/18; B29C 43/18; B29C 45/14467; B29C 45/14377; B29C 2045/14459; B29C 2045/14844; B29C 45/14836; B29L 2031/26; B29D 99/0053
See application file for complete search history.

(56) References Cited

U.S. PATENT DOCUMENTS

| | | | |
|---|---|---|---|
| 2,188,857 A | 1/1940 | Chievitz | |
| 3,276,115 A * | 10/1966 | Hansz | F16J 15/328 |
| | | | 29/527.1 |
| 3,497,225 A | 2/1970 | Workman | |
| 3,730,284 A | 5/1973 | Striegler | |
| 3,744,805 A | 7/1973 | Heinrich | |
| 3,838,862 A | 10/1974 | Fern | |

(Continued)

FOREIGN PATENT DOCUMENTS

| | | |
|---|---|---|
| GB | 499480 | 1/1939 |
| JP | 07-027133 Y2 | 6/1995 |
| WO | 20060104605 A2 | 10/2006 |

OTHER PUBLICATIONS

International Search Report and Written Opinion dated Aug. 20, 2019 for corresponding PCT/US2019/031527.

(Continued)

*Primary Examiner* — Leith S Shafi
(74) *Attorney, Agent, or Firm* — Bracewell LLP; Douglas W. Rommelmann

(57) ABSTRACT

A seal configuration, mold and manufacturing process that inhibits undesirable elastomer migration onto critical radially inwardly facing portions of a plastic-lined dynamic sealing lip, for improved high-pressure seal operation.

26 Claims, 9 Drawing Sheets

(56) References Cited

U.S. PATENT DOCUMENTS

| | | | |
|---|---|---|---|
| 3,868,105 A | 2/1975 | Bentley | |
| 3,901,517 A | 8/1975 | Heathcott | |
| 3,921,987 A | 11/1975 | Johnston et al. | |
| 3,927,600 A | 12/1975 | Peisker | |
| 3,929,340 A | 12/1975 | Peisker | |
| 3,973,781 A | 8/1976 | Grorich | |
| 3,984,113 A | 10/1976 | Bentley | |
| 4,067,407 A | 1/1978 | Berg | |
| 4,094,519 A | 6/1978 | Heyn et al. | |
| 4,118,856 A | 10/1978 | Bainard et al. | |
| 4,171,561 A * | 10/1979 | Bainard | F16J 15/3284 277/575 |
| 4,183,543 A | 1/1980 | Antonini | |
| 4,193,606 A | 3/1980 | Iverson | |
| 4,231,579 A | 11/1980 | Scannell | |
| 4,239,243 A * | 12/1980 | Bainard | F16J 15/3284 277/575 |
| 4,281,724 A | 8/1981 | Garrett | |
| 4,283,064 A | 8/1981 | Staab et al. | |
| 4,288,083 A | 9/1981 | Braconier | |
| 4,336,945 A | 6/1982 | Christiansen et al. | |
| 4,372,400 A | 2/1983 | Beimgraben | |
| 4,383,691 A | 5/1983 | Potter | |
| 4,387,902 A | 6/1983 | Conover | |
| 4,399,998 A | 8/1983 | Otto | |
| 4,406,847 A * | 9/1983 | O'Neal | B29C 43/18 264/262 |
| 4,440,405 A | 4/1984 | Schaus et al. | |
| 4,441,722 A | 4/1984 | Pichler | |
| 4,451,050 A | 5/1984 | Repella | |
| 4,464,322 A * | 8/1984 | Butler | F16J 15/328 277/575 |
| 4,476,944 A | 10/1984 | Beimgraben | |
| 4,484,753 A | 11/1984 | Kalsi | |
| 4,542,573 A | 9/1985 | Bainard | |
| 4,578,856 A * | 4/1986 | Butler | B29C 43/027 29/451 |
| 4,610,319 A | 9/1986 | Kalsi | |
| 4,619,534 A | 10/1986 | Daly et al. | |
| 4,671,519 A | 6/1987 | Bras et al. | |
| 4,705,277 A | 11/1987 | Repella | |
| 4,729,569 A | 3/1988 | Muller et al. | |
| 4,739,998 A | 4/1988 | Steusloff et al. | |
| 4,750,747 A | 6/1988 | Holzer | |
| 4,770,548 A | 9/1988 | Otto | |
| 4,783,086 A | 11/1988 | Bras | |
| 4,789,166 A | 12/1988 | Rericha et al. | |
| 4,851,176 A * | 7/1989 | Christiansen | B29C 43/18 425/DIG. 47 |
| 4,957,680 A * | 9/1990 | Saxod | B29C 45/14467 264/296 |
| 5,002,289 A | 3/1991 | Yasau et al. | |
| 5,139,275 A | 8/1992 | Ehrmann et al. | |
| 5,143,385 A | 9/1992 | Sponagel et al. | |
| 5,178,215 A | 1/1993 | Yenullis et al. | |
| 5,190,299 A | 3/1993 | Johnston | |
| 5,195,754 A | 3/1993 | Dietle | |
| 5,195,757 A | 3/1993 | Dahll | |
| 5,224,557 A | 7/1993 | Yenulis | |
| 5,230,520 A | 7/1993 | Dietle et al. | |
| 5,427,387 A | 6/1995 | Johnston | |
| 5,431,872 A * | 7/1995 | Sink | F16J 15/3284 264/161 |
| 5,482,296 A | 1/1996 | Peppiatt et al. | |
| 5,511,886 A | 4/1996 | Sink | |
| 5,647,444 A | 7/1997 | Williams | |
| 5,662,181 A | 9/1997 | Williams | |
| 5,678,829 A | 10/1997 | Kalsi | |
| 5,692,757 A | 12/1997 | Straub | |
| 5,704,615 A | 1/1998 | Wheeler | |
| 5,711,534 A | 1/1998 | Bengoa et al. | |
| 5,738,358 A | 4/1998 | Kalsi et al. | |
| 5,763,956 A | 6/1998 | Metz et al. | |
| 5,791,658 A | 8/1998 | Johnston | |
| 5,823,541 A | 10/1998 | Dietle et al. | |
| 5,873,576 A | 2/1999 | Dietle et al. | |
| 5,915,696 A | 6/1999 | Onuma et al. | |
| 5,921,555 A | 7/1999 | Johnston | |
| 6,007,105 A | 12/1999 | Dietle et al. | |
| 6,016,880 A | 1/2000 | Hall et al. | |
| 6,036,192 A | 3/2000 | Dietle et al. | |
| 6,105,968 A | 8/2000 | Yeh et al. | |
| 6,109,618 A | 8/2000 | Dietle | |
| 6,120,036 A | 9/2000 | Kalsi et al. | |
| 6,139,020 A | 10/2000 | Friend et al. | |
| 6,189,896 B1 | 2/2001 | Dickey et al. | |
| 6,227,547 B1 | 5/2001 | Dietle et al. | |
| 6,315,302 B1 | 11/2001 | Conroy et al. | |
| 6,334,619 B1 | 1/2002 | Dietle et al. | |
| 6,354,385 B1 | 3/2002 | Ford et al. | |
| 6,382,634 B1 | 5/2002 | Dietle et al. | |
| 6,431,552 B1 | 8/2002 | Ulrich | |
| 6,439,866 B1 | 8/2002 | Farkas et al. | |
| 6,494,462 B2 | 12/2002 | Dietle | |
| 6,554,016 B2 | 4/2003 | Kinder | |
| 6,561,520 B2 | 5/2003 | Kalsi et al. | |
| 6,685,194 B2 | 2/2004 | Dietle et al. | |
| 6,767,016 B2 | 7/2004 | Gobeli et al. | |
| 7,052,020 B2 | 5/2006 | Gobeli et al. | |
| 7,770,898 B2 | 8/2010 | Dietle et al. | |
| 8,075,000 B2 | 12/2011 | James et al. | |
| 8,505,924 B2 | 8/2013 | Dietle et al. | |
| 8,550,467 B2 | 10/2013 | Dietle et al. | |
| 9,086,151 B2 | 7/2015 | Dietle et al. | |
| 9,103,445 B2 | 8/2015 | Schroeder et al. | |
| 9,109,703 B2 | 8/2015 | Dietle et al. | |
| 9,121,503 B2 | 9/2015 | Dietle et al. | |
| 9,121,504 B2 | 9/2015 | Dietle et al. | |
| 2001/0024016 A1 | 9/2001 | Gobeli | |
| 2004/0104536 A1 | 6/2004 | Gobeli | |
| 2006/0214379 A1 | 9/2006 | James | |
| 2007/0013143 A1 | 1/2007 | Schroeder et al. | |
| 2009/0001671 A1 | 1/2009 | Dietle | |
| 2009/0250881 A1 | 10/2009 | Dietle | |
| 2010/0259015 A1 | 10/2010 | Dietle | |
| 2012/0013078 A1 | 1/2012 | Dietle | |

OTHER PUBLICATIONS http_www.seniorsstore_ca_Mobility_Walkers Jul. 22, 2019.
Kalsi, M.S., et al. "A Novel High-Pressure Rotary Shaft Seal Facilitates Innovations in Drilling and Production Equipment.", SPE#37627, 1997.

\* cited by examiner

ROTARY SEAL AND METHOD OF MAKING SAME

CROSS-REFERENCE TO RELATED APPLICATIONS

This application claims the benefit of U.S. Provisional Application Ser. No. 62/762,703 filed on May 15, 2018, by Lannie L. Dietle and entitled "Seal Manufacturing Method." Applicant incorporates by reference herein Application Ser. No. 62/762,703 in its entirety.

BACKGROUND OF THE INVENTION

1. Field of the Invention

The present invention relates generally to rotary seals for establishing sealing between relatively rotatable machine components and separating a lubricant-type first fluid from a second fluid, where the geometry of the seal interacts with the first fluid during relative rotation to wedge a lubricating film into the dynamic sealing interface between the seal and a relatively rotatable surface.

2. Description of the Related Art

Assignee Kalsi Engineering, Inc. has patented and manufactured numerous hydrodynamic rotary seals over the years designed to accommodate various operating conditions. Typically, these hydrodynamic rotary seals comprise a generally circular polymeric sealing element that establishes sealing between relatively rotatable machine components for lubricant retention and environmental exclusion. The rotary seals incorporate geometry that interacts with the lubricant during relative rotation to distribute a lubricant film within a dynamic sealing interface.

One such hydrodynamic rotary seal manufactured by Kalsi Engineering, Inc. is described in U.S. Pat. No. 7,562,878 and related continuation U.S. Pat. Nos. 8,056,904 and 9,086,151. The hydrodynamic rotary seal described in these patents partitions a pressurized lubricant from an environment. A dynamic sealing lip with a dynamic sealing surface and hydrodynamic lubrication geometry establishes compressed sealing engagement with a relatively rotatable surface of a shaft and pumps a film of lubricating fluid into the dynamic sealing interface between the dynamic sealing lip and the relatively rotatable surface in response to relative rotation. A wave form incorporating an elongated dimple provides the gradual convergence, efficient impingement angle, and gradual interfacial contact pressure rise that are conducive to efficient hydrodynamic wedging of lubricant into the dynamic interface. Skewed elevated contact pressure zones produced by compression edge effects provide for controlled lubricant movement within the dynamic sealing interface, producing enhanced lubrication and low running torque.

The patented hydrodynamic rotary seal described above has been an operationally and commercially successful seal—particularly in difficult sealing applications where the pressure of the lubricant fluid is significantly greater than the pressure of the environment or second fluid. FIG. 1 of the above referenced Kalsi Engineering patents shows the situation where the pressure of the lubricant or first fluid (6) is greater than the pressure of the second fluid (7). The pressure differential across the seal forces the seal against the environment-side wall (13) of the seal groove (26) and the seal bridges the extrusion gap (31) between the housing (8) and the shaft (10). FIG. 13 of the patents shows an embodiment with a composite structure where the surface of the dynamic lip (4) is defined by one material layer, and the energizer (21) is made from another material layer.

Of the type of hydrodynamic seals described in U.S. Pat. No. 7,562,878 and related continuation U.S. Pat. Nos. 8,056,904 and 9,086,151, an embodiment that has the highest pressure capacity is shown in FIG. 1A of commonly assigned Patent Application Publication No. US 2018/0335146 A1 ("the '146 Publication"), where the inner periphery of the seal is defined by a plastic layer (30), and the remainder of the seal is an elastomeric energizer (32), so the extrusion resistance of the seal is controlled by the plastic layer (30), and the interfacial contact pressure between the seal and the mating surface of a relatively rotatable surface (6) is controlled largely by the modulus of elasticity of the elastomeric energizer (32).

Paragraphs 0213 and 0214 of the '146 Publication describe a manufacturing problem associated with making the seal to original molded length (98), illustrated in FIG. 1K of the '146 Publication. The manufacturing problem is caused by the relatively short and stiff axial portion of the plastic liner (30) that is located to the left of the inside corner (97). The molding pressure doesn't always hold that portion of the plastic liner (30) tightly to the cavity of the mold during the molding process. As a result, the elastomer may inadvertently migrate to the wrong side of the plastic liner (30), which can lead to rejection of the part during inspection. Such rejections add to the cost of molding the rotary seal (4). The outside corner of the mold cavity that forms the inside corner (97) of the rotary seal (4) acts as a fulcrum during the molding process. Because of this fulcrum effect, the molding pressure acting on the long portion of the plastic liner (30) on the right side of the inside corner (97) tends to lift the short portion that is located to the left of the inside corner (97). This moves the plastic liner (30) away from the surface of the mold cavity, allowing the undesirable elastomer migration to occur.

Paragraphs 0215 and 0216 of the '146 Publication describe a solution to the elastomer migration problem, where the rotary seal (4) is molded to a length (98) that is longer than the finished seal, as shown in FIG. 1L. This allows the portion of the plastic liner (30) that is located to the left of the inside corner (97) to be longer and more flexible, so that elastomer pressure can hold that portion of the plastic liner tightly to the cavity of the mold during the molding process, inhibiting or entirely preventing the elastomer migration problem described above. When this method is used, the molded seal can be machined down to any desired axial length. For example, the described longer seal can be machined down to the machined length (106) that is shown in FIG. 1L to conserve seal and equipment length, while having a seal that avoids or largely avoids the elastomer migration issue during molding. For another example, the longer seal can be machined down to the machined length (100) to achieve the bi-directional pressure capability described in the '146 Publication.

A limitation of the manufacturing method described in the '146 Publication is the difficulty of fixturing the seal for the machining process. Machining forces tend to drag the seal out of the fixture, resulting in a significant percentage of misshapen damaged seals that are unusable. Thus, an improved manufacturing method for improved annular polymeric seals is desired.

SUMMARY OF THE INVENTION

The present invention relates generally to manufacturing improved annular polymeric seals for establishing sealing between a housing and a relatively rotatable surface of a shaft and separating a lubricant from a second fluid that is typically referred to as the environment, where a dynamic sealing surface of a dynamic lip engages the relatively rotatable surface. The dynamic sealing surface is provided by an inner surface of an annular plastic liner. A method is provided for manufacturing such seals where a specially configured mold is used to produce a specially configured seal shape that is then machined to a final configuration, where the mold configuration and specially configured seal shape inhibit elastomer from migrating between the mold cavity and the plastic liner during molding, and the finished machined seal is compact and does not have undesirable elastomer migrated onto critical surfaces of the dynamic lip.

The rotary seal is preferably produced by the following method:

(a) providing a mold for producing an annular polymeric seal, comprising:

a mold core having a lip forming surface of annular form and facing in a generally radially outward direction, and having an inner groove wall of annular form facing in a generally radially outward direction, and having a cavity groove end having at least a portion thereof facing in a generally axial direction, the inner groove wall being located in axially intermediate relation to the lip forming surface and the cavity groove end, and the lip forming surface being radially recessed relative to the inner groove wall;

a mold cap having a cap wall of annular form facing in a generally axial direction toward the cavity groove end, the lip forming surface being located in axially intermediate relation to the cap wall and the inner groove wall and located in axially intermediate relation to the cap wall and the cavity groove end;

a mold collar having a collar cavity surface of annular form facing generally radially inward toward and surrounding at least a portion of the lip forming surface;

one of the mold collar and the mold core having a mold shoulder of annular form facing in a generally axial direction toward the cap wall, at least a portion of the collar cavity surface being located in axially intermediate relation to the mold shoulder and the cap wall and at least a portion of the lip forming surface being located in axially intermediate relation to the mold shoulder and the cap wall;

one of the mold collar and the mold core having an outer groove wall of annular form facing radially inward toward and surrounding at least a portion of the inner groove wall, at least a portion of the outer groove wall being located in axially intermediate relation to the cavity groove end and the mold shoulder, and the outer groove wall being located in axially intermediate relation to the cavity groove end and the cap wall; and the cavity groove end, the inner groove wall, and the outer groove wall defining a cavity groove for forming an axial extension of a polymeric seal;

(b) using the mold to produce an annular polymeric seal having:

a lubricant end and an environment end facing in generally opposite, generally axial directions and separated by a distance, the lubricant end facing generally away from the environment end;

an inward surface of annular form facing in a generally radially inward direction;

an axial extension of annular form extending axially beyond the lubricant end and formed at least in part from the inward surface and having an outward surface facing in a generally radially outward direction away from the inward surface and encircling at least a portion of the inward surface, the outward surface being located in radially intermediate relation to the inward surface and the lubricant end;

a dynamic lip of annular form projecting radially inward relative to the inward surface and having a dynamic sealing surface of annular form facing in a generally radially inward direction;

a liner of annular form composed of plastic defining the dynamic sealing surface, the axial extension being located in radially intermediate relation to the dynamic sealing surface and the lubricant end; and (c) removing at least a portion of the axial extension by a machining operation, producing a machined seal surface facing in a generally axial direction away from the environment end and located in radially intermediate location to the lubricant end and the dynamic sealing surface.

A simplified way to express the method is:

(a) providing an annular seal having:

a lubricant end and an environment end facing in generally opposite, generally axial directions and separated by a distance, the lubricant end facing generally away from the environment end;

an inward surface of annular form facing in a generally radially inward direction;

an axial extension of annular form extending axially beyond the lubricant end and formed at least in part from the inward surface and having an outward surface facing in a generally radially outward direction away from the inward surface and encircling at least a portion of the inward surface, the outward surface being located in radially intermediate relation to the inward surface and the lubricant end;

a dynamic lip of annular form projecting radially inward relative to the inward surface and having a dynamic sealing surface of annular form facing in a generally radially inward direction;

a liner of annular form composed of plastic defining the dynamic sealing surface, the axial extension being located in radially intermediate relation to the dynamic sealing surface and the lubricant end; and (b) removing at least a portion of the axial extension by a machining operation, producing a machined seal surface facing in a generally axial direction away from the environment end and located in radially intermediate location to the lubricant end and the dynamic sealing surface.

Preferably, before the machining operation, a relief groove is located in radially intermediate relation to the lubricant end and the axial extension. Preferably, at least part of the relief groove is located in axially intermediate relation to the lubricant end and the environment end. Preferably, the relief groove is located radially outward of and encircles a portion of the liner.

Preferably, prior to the machining operation a relief groove surface is located in radially intermediate relation to the axial extension and the lubricant end and at least part of the relief groove surface is located in axially intermediate relation to the lubricant end and the environment end. Preferably, the relief groove surface is located radially outward of and encircles a portion of the inward surface. Preferably, the relief groove surface is located in radially intermediate relation to the machined seal surface and the lubricant end and at least part of the relief groove surface is located in axially intermediate relation to the lubricant end and the environment end.

Preferably, prior to the machining operation the outward surface is located radially outward of and encircles at least a portion of the liner. Preferably, prior to the machining operation the lubricant end is located radially outward of and encircles a portion of the inward surface and a portion of the liner. Preferably, prior to the machining operation the lubricant end is located radially outward of and encircles at least a portion of the liner.

Preferably, the machining operation removes a portion of the liner. Preferably, after the machining operation, a portion of the machined seal surface is formed by the liner.

Preferably, after the machining operation, the machined seal surface is substantially even with the lubricant end. Preferably, after the machining operation, the machined seal surface is separated from the environment end by a distance, and the distance separating the machined seal surface from the environment end is substantially the same as the distance separating the lubricant end from the environment end.

Preferably, the liner forms at least part of the environment end before and after the machining operation.

If desired, the machining operation may truncate a portion of the dynamic lip. If desired, the machined seal surface may form a radially undulating external corner with the dynamic lip.

Prior to the machining operation, the seal preferably comprises:

generally axially-facing surfaces forming a lubricant end and an environment end, the lubricant end and the environment end facing in generally opposite directions and separated by a distance, the lubricant end facing generally away from the environment end;

an inward surface of annular form facing in a generally radially inward direction and located radially inward of the lubricant end;

an axial extension of annular form extending axially beyond the lubricant end and formed at least in part from the inward surface and having an outward surface and an extension end surface, the outward surface facing in a generally radially outward direction away from the inward surface and encircling at least a portion of the inward surface, at least part of the extension end surface facing in a generally axial direction away from the environment end and spaced from the environment end by a distance;

the extension end surface being located in radially intermediate relation to the inward surface and the lubricant end, and the outward surface being located in radially intermediate relation to the extension end surface and the lubricant end, the distance between the extension end surface and the environment end being greater than the distance separating the lubricant end from the environment end, at least a portion of the outward surface located in axially intermediate relation to the extension end surface and the lubricant end, the lubricant end being located in axially intermediate relation to the extension end surface and the environment end;

a dynamic lip of annular form projecting radially inward relative to the inward surface and having a dynamic sealing surface of annular form facing in a generally radially inward direction;

a liner of annular form composed of plastic defining the dynamic sealing surface and at least a portion of the inward surface, the axial extension being located in radially intermediate relation to the dynamic sealing surface and the lubricant end and the inward surface being located in axially intermediate relation to the extension end surface and the dynamic lip.

Preferably, the outward surface is located radially outward of and encircles at least a portion of the liner. Preferably, the lubricant end is located radially outward of and encircles at least a portion of the liner. Preferably, the liner forms at least part of the environment end.

Preferably, a relief groove surface is located in radially intermediate relation to the axial extension and the lubricant end and at least part of the relief groove surface is located in axially intermediate relation to the lubricant end and the environment end. Preferably, the relief groove surface is located radially outward of and encircles a portion of the inward surface and a portion of the liner.

After the machining operation, the rotary seal preferably comprises:

generally axially-facing molded surfaces forming a lubricant end and an environment end, the lubricant end and the environment end facing in generally opposite directions and separated by a distance, the lubricant end facing generally away from the environment end;

an inward surface of annular form facing in a generally radially inward direction;

a dynamic lip of annular form projecting radially inward relative to the inward surface and having a dynamic sealing surface of annular form facing in a generally radially inward direction;

a liner of annular form composed of plastic defining the dynamic sealing surface and at least a portion of the inward surface, a machined seal surface formed by machining and facing in a generally axial direction away from the environment end and located in radially intermediate relation to the inward surface and the lubricant end and adjoining and forming an outside corner with the inward surface, the liner forming a portion of the machined seal surface.

Preferably, a relief groove is located in radially intermediate relation to the machined seal surface and the lubricant end and at least part of the relief groove is located in axially intermediate relation to the lubricant end and the environment end. Preferably, at least part of the relief groove is located radially outward of and encircles a portion of the inward surface and a portion of the liner.

Preferably, a relief groove surface is located in radially intermediate relation to the machined seal surface and the lubricant end and at least part of the relief groove surface is located in axially intermediate relation to the lubricant end and the environment end. Preferably, the relief groove surface is located radially outward of and encircles a portion of the inward surface and a portion of the liner.

Preferably, the liner forms a portion of the environment end. If desired, the machined seal surface may form a radially undulating external corner with the dynamic lip.

The mold for producing the annular polymeric seal preferably comprises:

a mold core having a lip forming surface of annular form and facing in a generally radially outward direction, and having an inner groove wall of annular form facing in a generally radially outward direction, and having a cavity groove end having at least a portion thereof facing in a generally axial direction, the inner groove wall being located in axially intermediate relation to the lip forming surface and the cavity groove end, and the lip forming surface being radially recessed relative to the inner groove wall;

a mold cap having a cap wall of annular form facing in a generally axial direction toward the cavity groove end, the lip forming surface being located in axially intermediate relation to the cap wall and the inner groove wall and located in axially intermediate relation to the cap wall and the cavity groove end;

a mold collar having a collar cavity surface of annular form facing generally radially inward toward and surrounding at least a portion of the lip forming surface;

one of the mold collar and the mold core having a mold shoulder of annular form facing in a generally axial direction toward the cap wall, at least a portion of the collar cavity surface being located in axially intermediate relation to the mold shoulder and the cap wall and at least a portion of the lip forming surface being located in axially intermediate relation to the mold shoulder and the cap wall;

one of the mold collar and the mold core having an outer groove wall of annular form facing radially inward toward and surrounding at least a portion of the inner groove wall, at least a portion of the outer groove wall being located in axially intermediate relation to the cavity groove end and the mold shoulder, and the outer groove wall being located in axially intermediate relation to the cavity groove end and the cap wall;

the cavity groove end, the inner groove wall, and the outer groove wall forming a cavity groove for forming an axial extension of a polymeric seal.

Preferably, a raised cavity surface of annular form is located in radially intermediate location to the mold shoulder and the outer groove wall and is located in axially intermediate relation to the mold shoulder and the cap wall.

This manufacturing method and special seal shape are particularly suitable for rotary seals of the type where the geometry of the seal interacts with the lubricant during relative rotation to wedge a lubricating film into the dynamic sealing interface between the seal and a mating relatively rotatable surface, such as the type of seal described in commonly assigned U.S. Pat. Nos. 7,562,878, 8,056,904 and 9,086,151 and the '146 Publication.

This manufacturing method and special seal shape are directed at prolonging seal life in high differential pressure operating conditions, by preventing migration of elastomer onto critical surfaces of the dynamic lip during molding of the seal, to prevent the interference with lubrication that such elastomer migration may cause.

Preferably, the seal has a multi-function edge that is generally convex when viewed in longitudinal cross-section and extends in a generally circumferential direction, having at least a portion that is skewed with respect to machined seal surface, as taught by commonly assigned U.S. Pat. Nos. 7,562,878, 8,056,904 and 9,086,151. Preferably, a circumferential portion of the multi-function edge forms a ramp section that has a portion thereof recessed relative to the dynamic sealing surface. Preferably, a dimple flank is located in intermediate location to a portion of the dynamic sealing surface and the ramp section and adjoins the dynamic sealing surface, and at least a portion of the recess flank is generally convex when viewed in longitudinal cross-section.

Preferably, a dimple is situated in intermediate relation to a portion of the dynamic sealing surface and the machined seal surface, and preferably at least a portion of the dimple has a sloping profile in a circumferential direction and forms a smooth transition with the dynamic sealing surface in a circumferential direction.

If desired, the machined seal surface may form a circular external corner with the inward surface of the seal, as taught by commonly assigned U.S. Pat. Nos. 7,562,878, 8,056,904 and 9,086,151. If desired, the machined seal surface may form a radially undulating external corner with a multi-function edge of the dynamic lip, as taught by the '146 Publication, to reduce the area over which differential pressure can act to create radially inward-acting force when the pressure of the environment is greater than the pressure of the lubricant.

BRIEF DESCRIPTION OF THE SEVERAL VIEWS OF THE DRAWINGS

The invention is better understood by reading the detailed description of embodiments which follows and by examining the accompanying drawings, in which.

DESCRIPTION OF THE PREFERRED EMBODIMENTS

FIGS. 1 to 7 show a method for producing a rotary seal that overcomes the machining problems associated with the prior art. FIGS. 1-7 should be studied together, to gain a more complete understanding of the invention, because the totality of the invention cannot be perfectly conveyed by any single figure. Features throughout this specification that are represented by like numbers have the same function.

All the figures herein are longitudinal cross-section type illustrations that are intended to be interpreted by the standard conventions of sectional view orthographic drawing projection practiced in the United States.

Throughout this specification, the term "longitudinal cross-section" means a cross-section taken at a cutting plane that passes through and aligns with that theoretical axis; i.e., the theoretical axis lies on the cutting plane of the cross-section. The term "axis" is well-understood in mechanical engineering, and in the field of drafting is sometimes illustrated using a centerline. In all the figures herein, the theoretical axis is represented by a conventional drafting centerline.

When used in this specification, the word "intermediate" has the ordinary dictionary meaning of, "occurring in the middle of a . . . series" (Merriam-Webster's Learner's Dictionary). In this specification, the definition of the words "adjoin," "adjoins" and "adjoining" includes the commonly accepted "adjoin" definition "to be close to or in contact with one another" that is provided by the Merriam-Webster online dictionary for the word "adjoin." Although these definitions are provided herein, they are not examples of the inventor being his own lexicographer, since the referenced definitions are simply commonly understood definitions.

Figure 1:
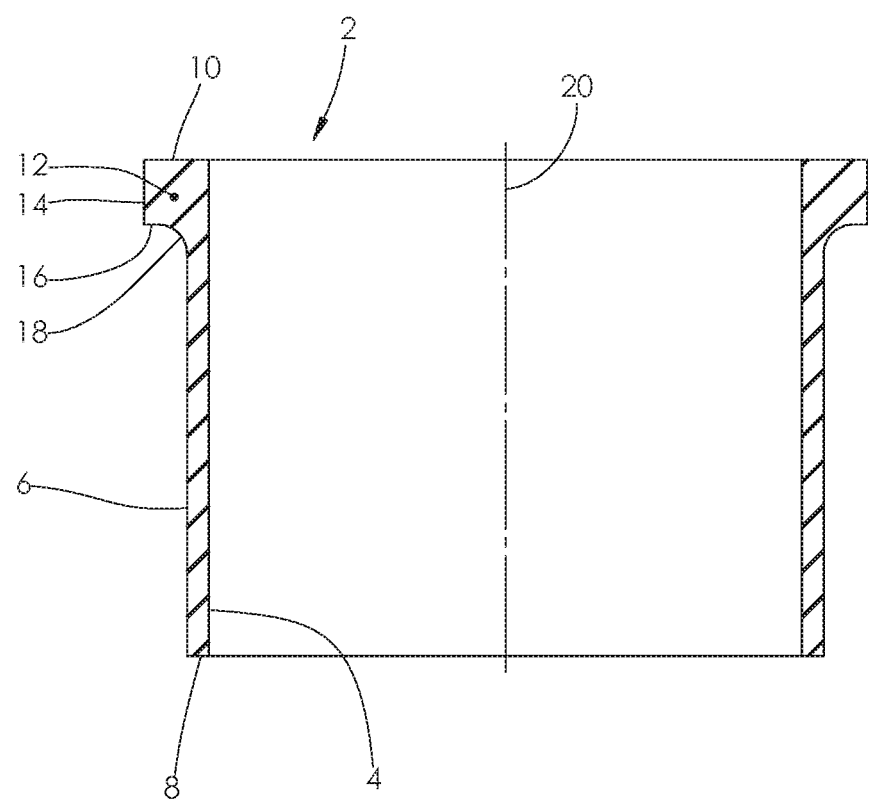
FIG. 1 is longitudinal cross-sectional view of a liner, the liner arranged and designed to be incorporated in a seal molded according to a preferred embodiment of the invention.

Description of FIG. 1

Referring now to the longitudinal cross-section of FIG. 1, a liner having annular form is shown generally at 2. The liner 2 is preferably formed from and composed of a plastic material having desirable physical properties and dynamic running characteristics. The liner 2 is preferably produced by a conventional lathe turning operation. The liner 2 has a liner inner surface 4 of annular form that faces in a generally radially inward direction. Preferably, the liner 2 has a liner outer surface 6 of annular form that faces in a generally radially outward direction, and in a direction generally opposite to the direction the liner inner surface 4 faces.

The liner 2 has first and second liner end surfaces, 8 and 10 respectively, that preferably face in generally opposite, generally axial directions. The liner 2 has a rim 12 that projects radially outward, however simplifications are possible where the rim 12 is omitted. The rim 12 has a rim outer surface 14 of annular form that preferably faces in a generally radially outward direction. Preferably, the rim 12 has a rim flank surface 16 that faces in a generally axial direction, facing generally away from the second liner end surface 10. Preferably the second liner end surface 10 and the rim flank surface 16 face in generally opposite directions, and the first liner end surface 8 and the rim flank surface 16 face in generally the same direction. Preferably, a fillet 18 is located in intermediate relation to the rim flank surface 16 and the liner outer surface 6 and is substantially tangent to the rim flank surface 16 and the liner outer surface 6. A theoretical axis 20 is represented by a centerline.

Preferably, the liner inner surface 4 is located in axially intermediate relation to and adjoins the first liner end surface 8 and the second liner end surface 10. Preferably the liner outer surface 6 is located in axially intermediate relation to the first liner end surface 8 and the second liner end surface 10. The liner outer surface 6 is preferably located in axially intermediate relation to the first liner end surface 8 and the rim flank surface 16. The first liner end surface 8 preferably adjoins and intersects the liner inner surface 4 and the liner outer surface 6. Preferably, the first liner end surface 8 is situated in radially intermediate location to the liner inner surface 4 and the liner outer surface 6. Preferably, the second liner end surface 10 adjoins and intersects the liner inner surface 4 and the rim outer surface 14. Preferably the second liner end surface 10 is situated in radially intermediate location to the liner inner surface 4 and the rim outer surface 14. The rim flank surface 16 preferably adjoins and intersects the rim outer surface 14. Preferably, the rim flank surface 16 is situated in radially intermediate location to the rim outer surface 14 and the liner outer surface 6. Preferably, the rim flank surface 16 is situated in radially intermediate location to the rim outer surface 14 and the liner inner surface 4. Preferably, the liner outer surface 6 is situated in radially intermediate location to the rim outer surface 14 and the liner inner surface 4. Preferably, the liner outer surface 6 is situated in radially intermediate location to the rim flank surface 16 and the liner inner surface 4.

Preferably, in preparation for the molding operation, a suitable bonding agent is applied to the liner outer surface 6, fillet 18, rim flank surface 16, and rim outer surface 14.

Figure 2:
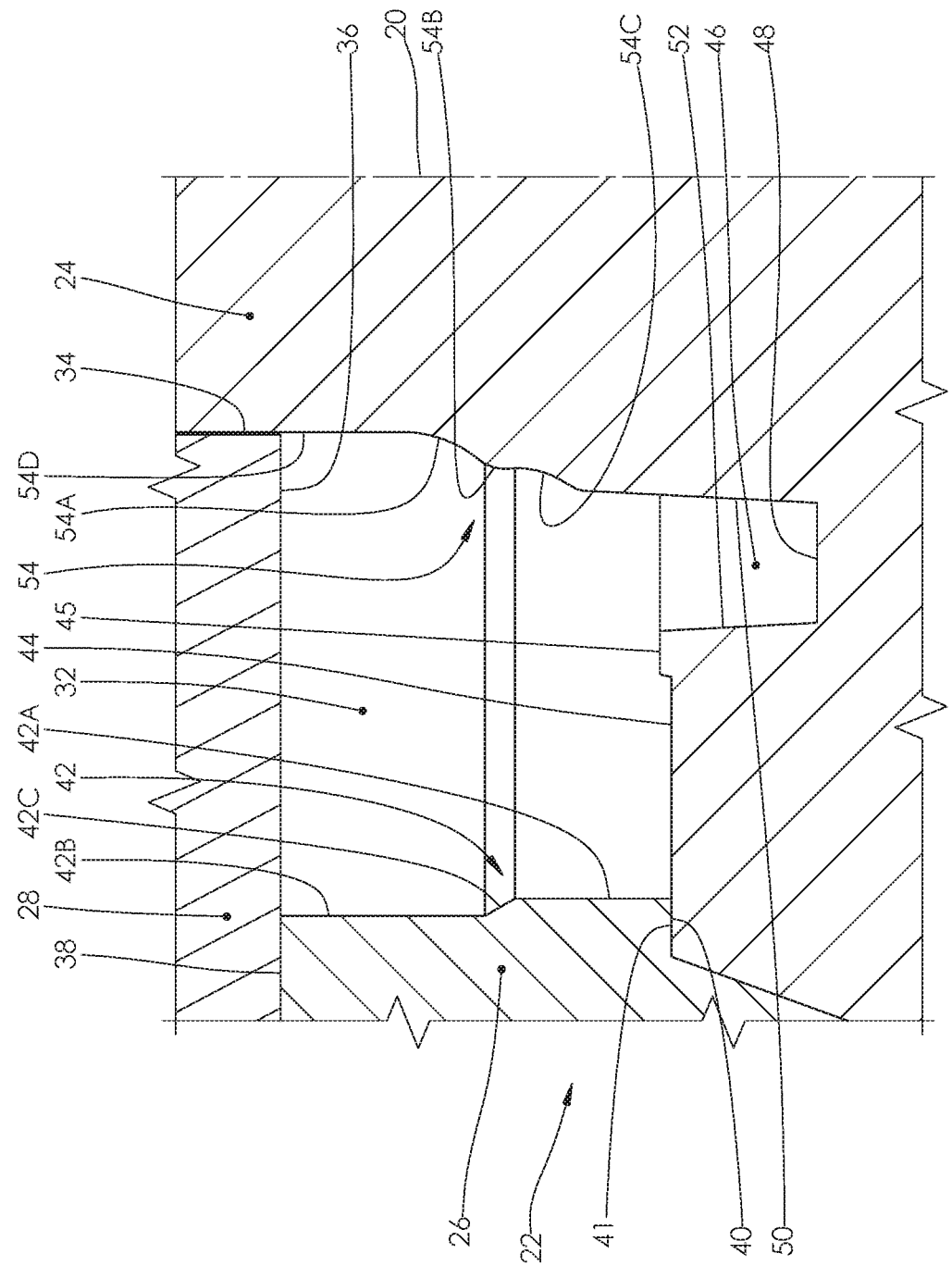
FIG. 2 is a fragmentary, longitudinal cross-sectional view of a mold according to a preferred embodiment of the invention, the mold shown in a closed position.

Description of FIG. 2

Referring now to the fragmentary longitudinal cross-section of FIG. 2, a mold is shown generally at 22 in the closed position. Preferably, the mold 22 includes a mold core 24, a mold collar 26, and a mold cap 28, all being of annular form, and all sharing the same theoretical axis 20 (represented by a centerline). The mold 22 defines a mold cavity 32. Preferably, the mold collar 26 and the mold cap 28 are axially separable from the mold core 24 and from one another. The mold cavity 32 is formed in a shape that is appropriate for molding a rotary seal.

Preferably, the mold cap 28 has a pilot surface 34 that faces in a generally radially inward direction toward the mold core 24 and locates the mold cap 28 laterally with respect to the mold core 24. Preferably the mold cap 28 has a cap wall 36 that faces in a generally axial direction and forms a part of the mold cavity 32. Preferably, a portion of the cap wall 36 faces toward and adjoins the mold collar 26. The pilot surface 34 and the cap wall 36 are preferably annular surfaces.

Preferably, the mold collar 26 has a collar end surface 38 that faces in a generally axial direction toward and adjoins the cap wall 36, locating the mold cap 28 axially when the mold 22 is closed. Preferably the mold collar 26 has a collar shoulder 40 that faces in a generally axial direction toward and adjoining a locating surface 41 portion of the mold core 24, locating the mold collar 26 axially when the mold 22 is closed—it being understood that the mold core 24 can, if desired, be one part as shown, or an assembly of parts. In the illustrated embodiment, the locating surface 41 portion of the mold core 24 is a part of a mold shoulder 44 that forms a surface of the mold cavity 32, but other arrangements are possible. Preferably, the mold collar 26 has a collar cavity surface, shown generally as 42, that faces in a generally radially inward direction, and may be a relatively complex surface as shown. Preferably, the collar cavity surface 42 forms a portion of the surfaces that define the mold cavity 32.

Figure 5:
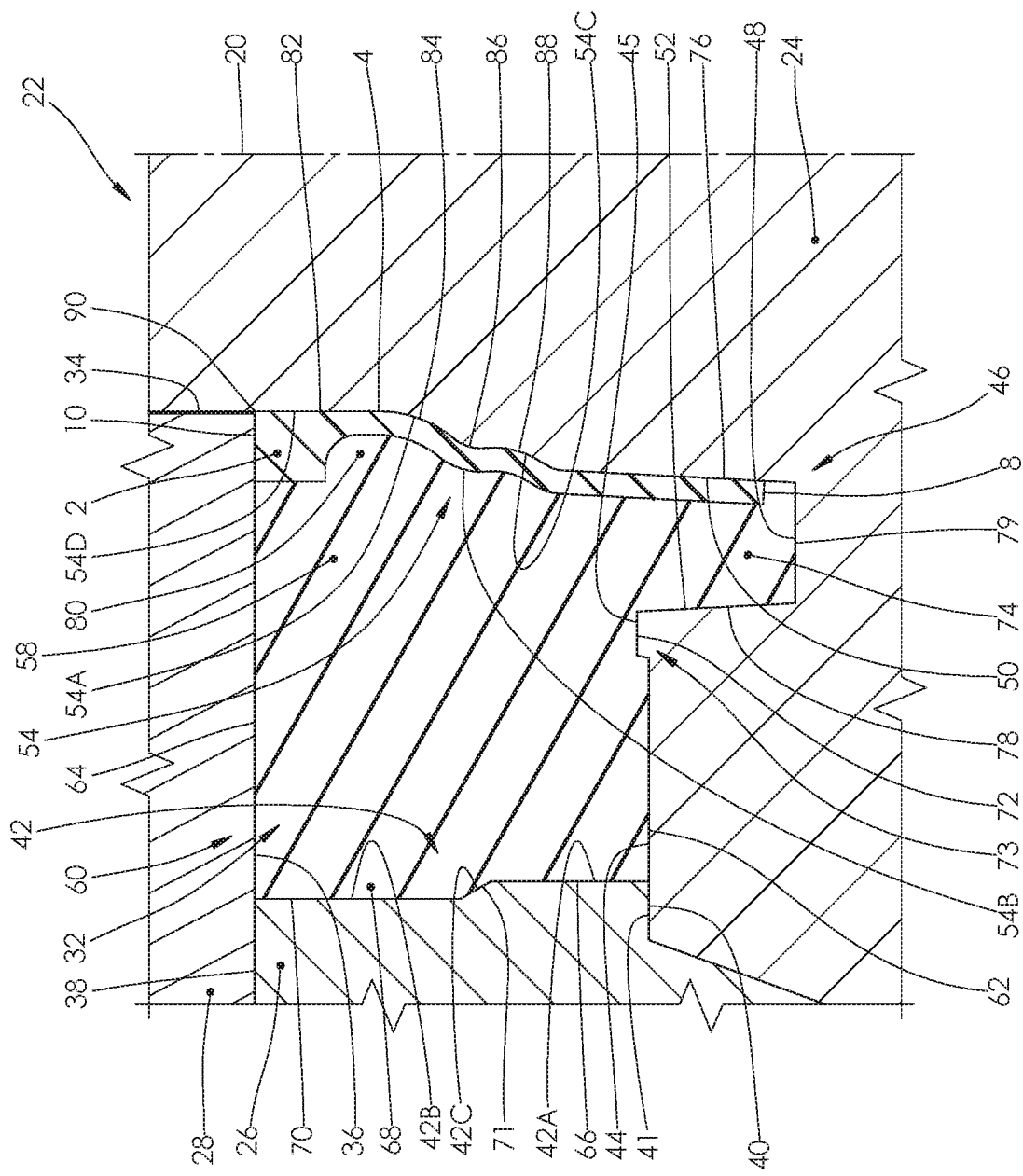
FIG. 5 is a fragmentary, longitudinal cross-sectional view of the mold in the closed position showing the process of molding a seal having a liner.

Preferably, the collar cavity surface 42 includes a body forming surface 42A that faces in a generally radially inward direction toward the mold core 24 and forms a portion of the mold cavity 32 that is provided to form a recessed radially outward facing body surface 66 of a rotary seal 60 as shown in FIG. 5.

Preferably, the collar cavity surface 42 includes a static lip forming surface 42B that faces in a generally radially inward direction toward the mold core 24 and forms a portion of the mold cavity 32 that is provided to form a radially outward facing static sealing surface 70 of the static lip 68 of the rotary seal 60 as shown in FIG. 5.

Preferably, the collar cavity surface 42 includes a flank forming surface 42C that faces in a generally radially inward direction toward the mold core 24 and forms a portion of the mold cavity 32 that is provided to form a generally radially outward facing lip flank 71 of the static lip 68 of the rotary seal 60 as shown in FIG. 5.

Preferably, the flank forming surface 42C is positioned in axially intermediate location to the body forming surface 42A and the static lip forming surface 42B. Preferably, the flank forming surface 42C is positioned in axially intermediate location to the collar end surface 38 and the collar shoulder 40. Preferably the static lip forming surface 42B is positioned in axially intermediate location to the collar end surface 38 and the flank forming surface 42C. Preferably the body forming surface 42A is positioned in axially intermediate location to the flank forming surface 42C and the collar shoulder 40.

Preferably, the collar cavity surface 42 is positioned in axially intermediate location to the collar end surface 38 and the collar shoulder 40. Preferably, the collar cavity surface 42 is positioned in axially intermediate location to the cap wall 36 and the collar shoulder 40. Preferably, at least a portion of the collar cavity surface 42 is situated in axially intermediate location to a portion of the mold cap 28 and a portion of the mold core 24.

Preferably, the collar end surface 38 and the collar shoulder 40 face in generally opposite directions, away from one another. Preferably, the collar end surface 38 and the cap wall 36 face in generally opposite directions, toward one another. Preferably, the collar end surface 38, collar shoulder 40, and collar cavity surface 42 are annular surfaces. Preferably, the body forming surface 42A, static lip forming surface 42B, and flank forming surface 42C are annular surfaces.

The mold core 24, as mentioned above, can be made from more than one component if desired. If desired, it can also be hollow as a weight savings measure.

Preferably, the mold core 24 has a mold shoulder 44 that faces in a generally axial direction toward the cap wall 36 and forms a portion of the mold cavity 32 that is provided for forming a generally axially facing lubricant end of a rotary seal. Preferably, the mold core 24 has a raised cavity surface 45 of annular form that faces in a generally axial direction toward the cap wall 36 and forms a portion of the mold cavity 32 that is provided for forming an annular generally axially facing relief groove surface on a molded end of a rotary seal.

Preferably, the mold core 24 incorporates a cavity groove 46 of annular form that forms a part of the mold cavity 32 that is provided for forming an annular axial extension feature of a rotary seal. Preferably, the cavity groove 46 has a cavity groove end 48 of annular form that faces in a generally axial direction toward the cap wall 36 and is provided for forming an extension end surface of an annular axial extension feature of a rotary seal. Preferably, the cavity groove 46 has an inner groove wall 50 and an outer groove wall 52 of annular form that face generally toward one another. Preferably, the inner groove wall 50 faces in a generally radially outward direction toward the outer groove wall 52. Preferably, the outer groove wall 52 faces in a generally radially inward direction toward the inner groove wall 50. If desired, the inner groove wall 50 and the outer groove wall 52 can have draft angles, as shown, to facilitate the demolding process (i.e., removing a molded rotary seal from the mold cavity 32 of the mold 22). The draft of the inner groove wall 50 also provides a molding advantage, as will be described later. Preferably, the outer groove wall 52 is located radially outward of and encircles at least a portion of the inner groove wall 50. Preferably, the inner groove wall 50 is located radially inward from and encircled by the outer groove wall 52.

Preferably, the cavity groove 46 has an open end that faces (i.e., opens) in a generally axial direction toward the cap wall 36. Preferably the draft of the inner groove wall 50 and the outer groove wall 52 causes the open end of the cavity groove 46 to be radially wider than the closed end of the cavity groove 46 that is formed by the cavity groove end 48. Preferably, the radial distance separating the inner groove wall 50 and the outer groove wall 52 is greater at the end of the cavity groove 46 that is nearest to the cap wall 36 compared to the radial distance separating the inner groove wall 50 and the outer groove wall 52 at the end of the cavity groove 46 that is most distant from the cap wall 36. Preferably the cavity groove end 48 is positioned radially intermediate to the inner groove wall 50 and the outer groove wall 52. Preferably, the cavity groove end 48 adjoins and intersects the inner groove wall 50 and the outer groove wall 52. The outer groove wall 52 preferably adjoins and intersects the raised cavity surface 45.

Preferably, the mold core 24 incorporates a lip forming surface 54 of annular form that faces in a generally radially outward direction and forms a part of the mold cavity 32 that is provided for forming a dynamic lip 80 (FIG. 5) of the rotary seal. The lip forming surface 54 is preferably annular. A portion of the lip forming surface 54 is preferably convoluted. Preferably, the lip forming surface 54 includes a flank forming surface 54A that is concave when viewed in longitudinal cross-section and forms a portion of the mold cavity 32 that is provided for forming a dimple flank 84 (FIG. 5), a flank of the type of rotary seal described in U.S. Pat. No. 7,562,878.

Preferably, the lip forming surface 54 includes a dimple forming surface 54B that is convex when viewed in longitudinal cross-section and forms a portion of the mold cavity 32 that is provided for forming a dimple 86 (FIG. 5), a dimple of the type of rotary seal described in U.S. Pat. No. 7,562,878.

Preferably, the lip forming surface 54 includes an edge forming surface 54C that is concave when viewed in longitudinal cross-section and forms a portion of the mold cavity 32 that is provided for forming multi-function edges 88 (FIG. 5), multi-function edges of the type of rotary seal that is described in U.S. Pat. No. 7,562,878. Preferably, the edge forming surface 54C varies in axial location around the mold core 24. Preferably, portions of the edge forming surface 54C also vary in radial location to form ramp sections like the ramp sections (48CW, 48CCW) described in U.S. Pat. No. 7,562,878.

Preferably, the lip forming surface 54 includes a periphery forming surface 54D that forms a portion of the mold cavity 32 that is provided for forming the dynamic surface 82 (FIG. 5), the dynamic surface of the type of rotary seal described in U.S. Pat. No. 7,562,878. Preferably the lip forming surface 54 varies in axial width around the mold core 24. Preferably, the lip forming surface 54 faces in a generally radially outward direction toward the collar cavity surface 42, and preferably, the collar cavity surface 42 faces in a generally radially inward direction toward the lip forming surface 54.

Preferably the radial distance between at least a portion of the flank forming surface 54A and the theoretical axis 20 is greater than the radial distance between the periphery forming surface 54D and the theoretical axis 20. Preferably the radial distance between at least a portion of the dimple forming surface 54B and the theoretical axis 20 is greater than the radial distance between the periphery forming surface 54D and the theoretical axis 20. Preferably the radial distance between at least a portion of the edge forming surface 54C and the theoretical axis 20 is greater than the radial distance between the periphery forming surface 54D and the theoretical axis 20. Preferably the radial distance between the inner groove wall 50 and the theoretical axis 20 is greater than the radial distances separating the pilot surface 34 and periphery forming surface 54D from the theoretical axis 20. Preferably the radial distance between the pilot surface 34 and the theoretical axis 20 is greater than the radial distance between periphery forming surface 54D and the theoretical axis 20. Preferably the radial distance between the cavity groove end 48 and the theoretical axis 20 is greater than the radial distances separating the pilot surface 34, lip forming surface 54, and the inner groove wall 50 from the theoretical axis 20. Preferably the radial distance between the outer groove wall 52 and the theoretical axis 20 is greater than the radial distances separating the pilot surface 34, cavity groove end 48, lip forming surface 54, and the inner groove wall 50 from the theoretical axis 20. Preferably the radial distance between the raised cavity surface 45 and the theoretical axis 20 is greater than the radial distances separating the pilot surface 34, outer groove wall 52, cavity groove end 48, lip forming surface 54, and the inner groove wall 50 from the theoretical axis 20.

Preferably the radial distance between the mold shoulder 44 and the theoretical axis 20 is greater than the radial distances separating the pilot surface 34, raised cavity surface 45, outer groove wall 52, cavity groove end 48, lip forming surface 54, and the inner groove wall 50 from the theoretical axis 20. Preferably the radial distance between the body forming surface 42A and the theoretical axis 20 is greater than the radial distances separating the pilot surface 34, cap wall 36, mold shoulder 44, raised cavity surface 45, outer groove wall 52, cavity groove end 48, lip forming surface 54, and the inner groove wall 50 from the theoretical axis 20. Preferably the radial distance between the flank forming surface 42C and the theoretical axis 20 is greater than the radial distances separating the pilot surface 34, cap wall 36, mold shoulder 44, raised cavity surface 45, outer groove wall 52, cavity groove end 48, lip forming surface 54, and the inner groove wall 50 from the theoretical axis 20. Preferably the radial distance between the static lip forming surface 42B and the theoretical axis 20 is greater than the radial distances separating the pilot surface 34, cap wall 36, body forming surface 42A, mold shoulder 44, raised cavity surface 45, outer groove wall 52, cavity groove end 48, lip forming surface 54, and the inner groove wall 50 from the theoretical axis 20.

Preferably, the inner groove wall 50 is positioned in axially intermediate relation to the cavity groove end 48 and the edge forming surface 54C. Preferably, the inner groove wall 50 is positioned in axially intermediate relation to the cavity groove end 48 and the dimple forming surface 54B. Preferably, the inner groove wall 50 is positioned in axially intermediate relation to the cavity groove end 48 and the flank forming surface 54A. Preferably, the inner groove wall 50 is positioned in axially intermediate relation to the cavity groove end 48 and the periphery forming surface 54D. Preferably, the inner groove wall 50 is positioned in axially intermediate relation to the cavity groove end 48 and the cap wall 36.

Preferably, the outer groove wall 52 is positioned in axially intermediate relation to the cavity groove end 48 and the edge forming surface 54C. Preferably, the outer groove wall 52 is positioned in axially intermediate relation to the cavity groove end 48 and the dimple forming surface 54B. Preferably, the outer groove wall 52 is positioned in axially intermediate relation to the cavity groove end 48 and the flank forming surface 54A. Preferably, the outer groove wall 52 is positioned in axially intermediate relation to the cavity groove end 48 and the periphery forming surface 54D. Preferably, the outer groove wall 52 is positioned in axially intermediate relation to the cavity groove end 48 and the cap wall 36. Preferably, the outer groove wall 52 is positioned in axially intermediate relation to the cavity groove end 48 and the raised cavity surface 45. Preferably, the outer groove wall 52 is positioned in axially intermediate relation to the cavity groove end 48 and the flank forming surface 42C. Preferably, the outer groove wall 52 is positioned in axially intermediate relation to the cavity groove end 48 and the static lip forming surface 42B.

Preferably, the raised cavity surface 45 is positioned in axially intermediate relation to the cavity groove end 48 and the flank forming surface 54A. Preferably, the raised cavity surface 45 is positioned in axially intermediate relation to the cavity groove end 48 and the periphery forming surface 54D. Preferably, the raised cavity surface 45 is positioned in axially intermediate relation to the cavity groove end 48 and the cap wall 36. Preferably, the raised cavity surface 45 is positioned in axially intermediate relation to the cavity groove end 48 and the flank forming surface 42C. Preferably, the raised cavity surface 45 is positioned in axially intermediate relation to the cavity groove end 48 and the static lip forming surface 42B. Preferably, the raised cavity surface 45 is positioned in axially intermediate relation to the cavity groove end 48 and the dimple forming surface 54B. If desired, the raised cavity surface 45 can be positioned in axially intermediate relation to the cavity groove end 48 and the edge forming surface 54C.

Preferably, the raised cavity surface 45 is positioned in axially intermediate relation to the mold shoulder 44 and the flank forming surface 42C. Preferably, the raised cavity surface 45 is positioned in axially intermediate relation to the mold shoulder 44 and the static lip forming surface 42B. Preferably, the raised cavity surface 45 is positioned in axially intermediate relation to the mold shoulder 44 and the cap wall 36. Preferably, the raised cavity surface 45 is positioned in axially intermediate relation to the mold shoulder 44 and the flank forming surface 54A. Preferably, the raised cavity surface 45 is positioned in axially intermediate relation to the mold shoulder 44 and the periphery forming surface 54D. Preferably, the raised cavity surface 45 is positioned in axially intermediate relation to the mold shoulder 44 and the pilot surface 34. Preferably, the raised cavity surface 45 is positioned in axially intermediate relation to the mold shoulder 44 and the dimple forming surface 54B. If desired, the raised cavity surface 45 can be positioned in axially intermediate relation to the cavity groove end 48 and the edge forming surface 54C.

Preferably, the mold shoulder 44 is positioned in axially intermediate relation to the cavity groove end 48 and the body forming surface 42A. Preferably, the mold shoulder 44 is positioned in axially intermediate relation to the cavity groove end 48 and the flank forming surface 42C. Preferably, the mold shoulder 44 is positioned in axially intermediate relation to the cavity groove end 48 and the static lip forming surface 42B. Preferably, the mold shoulder 44 is positioned in axially intermediate relation to the cavity groove end 48 and the cap wall 36. Preferably, the mold shoulder 44 is positioned in axially intermediate relation to the cavity groove end 48 and the pilot surface 34. Preferably, the mold shoulder 44 is positioned in axially intermediate relation to the cavity groove end 48 and the periphery forming surface 54D. Preferably, the mold shoulder 44 is positioned in axially intermediate relation to the cavity groove end 48 and the dimple forming surface 54B. If desired, the mold shoulder 44 can be positioned in axially intermediate relation to the cavity groove end 48 and the flank forming surface 54A.

Preferably, the collar cavity surface 42 is positioned in axially intermediate relation to the cavity groove end 48 and the collar end surface 38. Preferably, the collar cavity surface 42 is positioned in axially intermediate relation to the cavity groove end 48 and the cap wall 36. Preferably, the collar cavity surface 42 is positioned in axially intermediate relation to the cavity groove end 48 and the pilot surface 34.

Preferably, the collar cavity surface 42 is positioned in axially intermediate relation to the mold shoulder 44 and the collar end surface 38. Preferably, the collar cavity surface 42 is positioned in axially intermediate relation to the mold shoulder 44 and the cap wall 36. Preferably, the collar cavity surface 42 is positioned in axially intermediate relation to the mold shoulder 44 and the pilot surface 34.

Preferably, the inner groove wall 50 is positioned in radially intermediate location to the periphery forming surface 54D and the outer groove wall 52. Preferably, the inner groove wall 50 is positioned in radially intermediate location to the periphery forming surface 54D and the raised cavity surface 45. Preferably, the inner groove wall 50 is positioned in radially intermediate location to the periphery forming surface 54D and the mold shoulder 44. Preferably, the inner groove wall 50 is positioned in radially intermediate location to the periphery forming surface 54D and the collar cavity surface 42.

Preferably, the cavity groove 46 is positioned in radially intermediate location to the periphery forming surface 54D and the raised cavity surface 45. Preferably, the cavity groove 46 is positioned in radially intermediate location to the periphery forming surface 54D and the mold shoulder 44. Preferably, the cavity groove 46 is positioned in radially intermediate location to the periphery forming surface 54D and the collar cavity surface 42.

Preferably, the outer groove wall 52 is positioned in radially intermediate location to the periphery forming surface 54D and the raised cavity surface 45. Preferably, the outer groove wall 52 is positioned in radially intermediate location to the periphery forming surface 54D and the mold shoulder 44. Preferably, the outer groove wall 52 is positioned in radially intermediate location to the periphery forming surface 54D and the collar cavity surface 42.

Preferably, the outer groove wall 52 is positioned in radially intermediate location to the inner groove wall 50 and the raised cavity surface 45. Preferably, the outer groove wall 52 is positioned in radially intermediate location to the inner groove wall 50 and the mold shoulder 44. Preferably, the outer groove wall 52 is positioned in radially intermediate location to the inner groove wall 50 and the collar cavity surface 42.

Preferably, the outer groove wall 52 is positioned in radially intermediate location to the cavity groove end 48 and the raised cavity surface 45. Preferably, the outer groove wall 52 is positioned in radially intermediate location to the cavity groove end 48 and the mold shoulder 44. Preferably, the outer groove wall 52 is positioned in radially intermediate location to the cavity groove end 48 and the collar cavity surface 42.

Preferably, the raised cavity surface 45 is positioned in radially intermediate location to the mold shoulder 44 and the outer groove wall 52. Preferably, the raised cavity surface 45 is positioned in radially intermediate location to the mold shoulder 44 and the cavity groove end 48. Preferably, the raised cavity surface 45 is positioned in radially intermediate location to the mold shoulder 44 and the cavity groove 46. Preferably, the raised cavity surface 45 is positioned in radially intermediate location to the mold shoulder 44 and the inner groove wall 50. Preferably, the raised cavity surface 45 is positioned in radially intermediate location to the mold shoulder 44 and the flank forming surface 54A. Preferably, the raised cavity surface 45 is positioned in radially intermediate location to the mold shoulder 44 and the dimple forming surface 54B. Preferably, the raised cavity surface 45 is positioned in radially intermediate location to the mold shoulder 44 and the edge forming surface 54C. Preferably, the raised cavity surface 45 is positioned in radially intermediate location to the mold shoulder 44 and the periphery forming surface 54D. Preferably, the raised cavity surface 45 is positioned in radially intermediate location to the mold shoulder 44 and the pilot surface 34.

Preferably, the raised cavity surface 45 is positioned in radially intermediate location to the collar cavity surface 42 and the outer groove wall 52. Preferably, the raised cavity surface 45 is positioned in radially intermediate location to the collar cavity surface 42 and the cavity groove end 48. Preferably, the raised cavity surface 45 is positioned in radially intermediate location to the collar cavity surface 42 and the cavity groove 46. Preferably, the raised cavity surface 45 is positioned in radially intermediate location to the collar cavity surface 42 and the inner groove wall 50. Preferably, the raised cavity surface 45 is positioned in radially intermediate location to the collar cavity surface 42 and the flank forming surface 54A. Preferably, the raised cavity surface 45 is positioned in radially intermediate location to the collar cavity surface 42 and the dimple forming surface 54B. Preferably, the raised cavity surface 45 is positioned in radially intermediate location to the collar cavity surface 42 and the edge forming surface 54C. Preferably, the raised cavity surface 45 is positioned in radially intermediate location to the collar cavity surface 42 and the periphery forming surface 54D. Preferably, the raised cavity surface 45 is positioned in radially intermediate location to the collar cavity surface 42 and the pilot surface 34.

Figure 3:
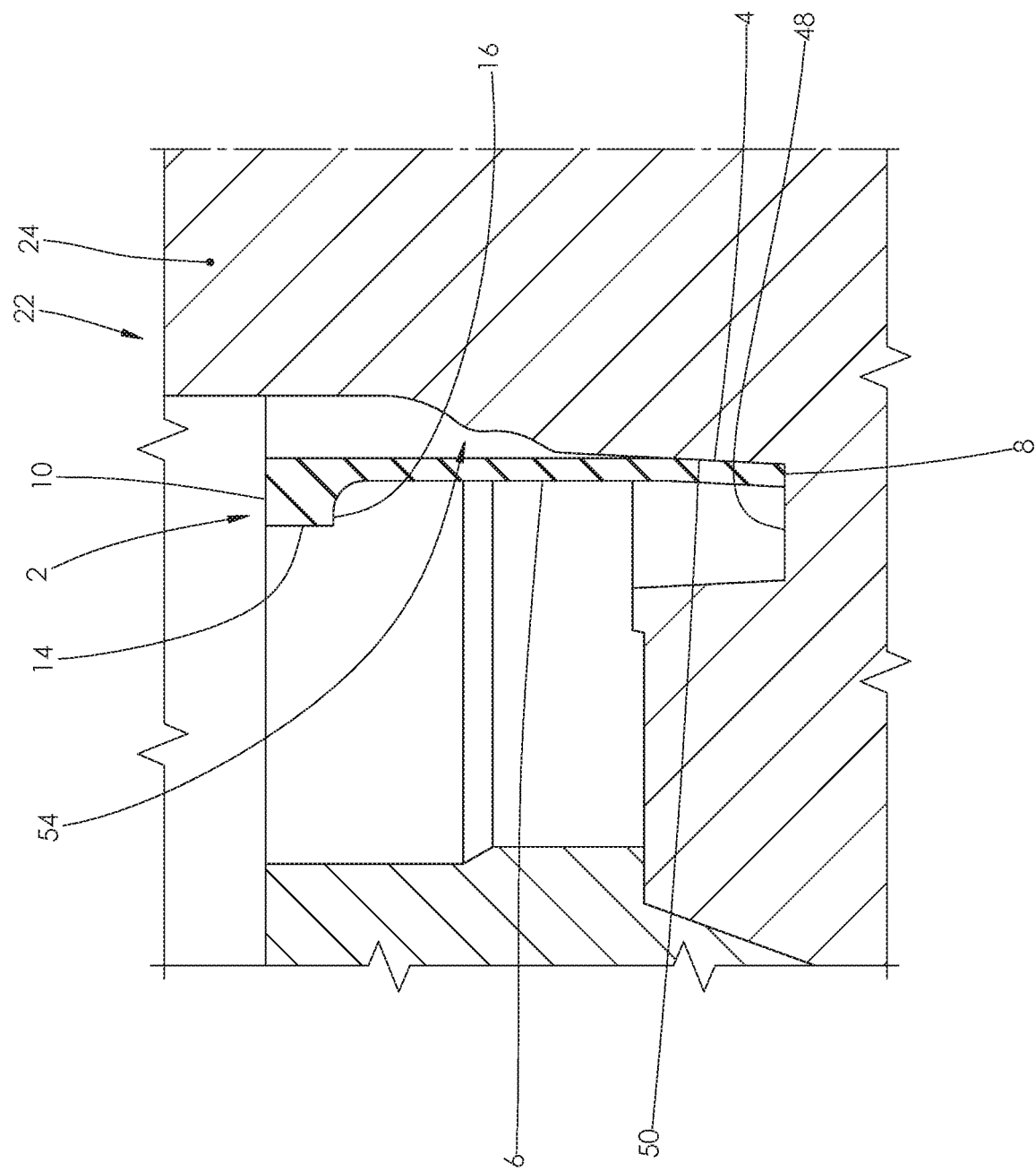
FIG. 3 is a fragmentary, longitudinal cross-sectional view of the mold shown in FIG. 2 with the mold in an open position and a liner installed.

Description of FIG. 3

Referring now to the fragmentary longitudinal cross-section of FIG. 3, after preheating to a suitable elastomer molding temperature, the mold 22 is opened, with the mold cap and mold collar preferably removed and temporarily set aside. The liner 2 is then installed onto the mold core 24. Preferably, the liner inner surface 4 has an interference fit with the inner groove wall 50. This interference, combined with the draft angle of the inner groove wall 50, helps to initiate sealing between the liner inner surface 4 and inner groove wall 50, which helps to prevent elastomer from migrating between the liner inner surface 4 and the inner groove wall 50 during the molding process.

Preferably, the liner 2 is located radially outward of and encircles at least a portion of the inner groove wall 50 and the lip forming surface 54. Preferably, the liner inner surface 4 faces radially inward toward, encircles, and contacts at least part of the inner groove wall 50. Preferably, the liner inner surface 4 faces radially inward toward and encircles at least part of the lip forming surface 54.

Preferably, the liner outer surface 6 is located radially outward of, encircles, and faces radially away from at least a portion of the inner groove wall 50 and at least a portion of the lip forming surface 54. Preferably, rim outer surface 14 is located radially outward of, encircles, and faces radially away from at least a portion of the lip forming surface 54.

Preferably, the first liner end surface 8 faces toward and adjoins the cavity groove end 48, and preferably the first liner end surface 8 abuts the cavity groove end 48. Preferably, the cavity groove end 48 faces toward the first liner end surface 8 and the rim flank surface 16. Preferably, the rim flank surface 16 faces toward the cavity groove end 48, and preferably the second liner end surface 10 faces away from the cavity groove end 48.

Figure 4:
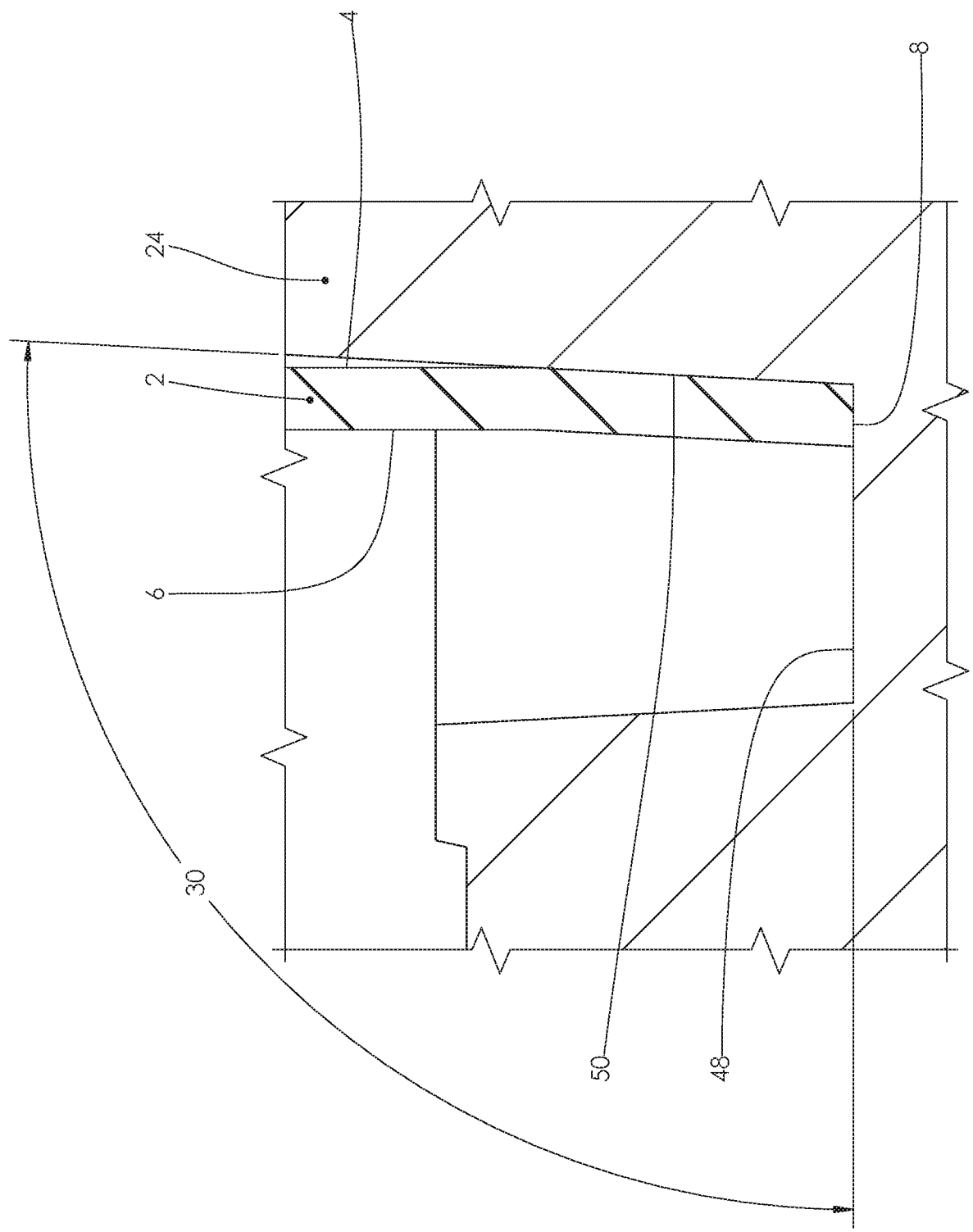
FIG. 4 is an enlarged view of a portion of the mold shown in FIG. 3 showing a preferred fit between the liner and an inner groove wall of the mold.

Description of FIG. 4

Referring now to the fragmentary longitudinal cross-section of FIG. 4, an enlargement of a portion of FIG. 3 is shown to illustrate the preferred fit between the liner 2 and the inner groove wall 50. Preferably, the inner groove wall 50 has a wall angle 30 relative to the cavity groove end 48 that is greater than 90 degrees (90°), however simplifications are possible where the wall angle 30 is 90°. One purpose of the wall angle 30 is to facilitate separation of the molded seal from the inner groove wall 50; i.e., the normal purpose of a draft angle on a mold surface. Another purpose is to preferably create contact between and interference between end portions of the liner inner surface 4 and the inner groove wall 50 near the first liner end surface 8, and near the cavity groove end 48. The preferred state of interference between the end portions of the liner 2 and the inner groove wall 50 creates contact pressure between the liner inner surface 4 and the inner groove wall 50 that helps to initiate sealing between the liner 2 and the inner groove wall 50 to help to prevent elastomer migration between the liner 2 and the inner groove wall 50 during the molding process. Rubber pressure acting on the liner outer surface 6 increases this sealing effect.

During molding, circumstances can arise where the elevated temperature of the mold core 24 causes the liner 2 to thermally expand, because the coefficient of thermal expansion of the liner 2 (being made of plastic) is greater than that of the mold core 24, which is preferably made from steel. This differential thermal expansion situation can cause the liner to lose the desired interference with the inner groove wall 50 near the cavity groove end 48. Even in this circumstance, having the wall angle 30 greater than 90° promotes sealing between the liner 2 and the inner groove wall 50. During the molding process, the pressure of the elastomer acts on the liner outer surface 6 and compresses the liner 2 to a smaller diameter. If the wall angle 30 is greater than 90°, the initial contact between the liner 2 and the inner groove wall 50 will be near the first liner end surface 8 and near the cavity groove end 48. This initial contact, and its location, helps to prevent undesirable elastomer migration between the liner 2 and the inner groove wall 50. Elastomer pressure acting on the portion of the length of the liner 2 that is not yet in contact with the inner groove wall 50 is reacted at the location near the cavity groove end 48 where the liner 2 is contacting the inner groove wall 50, which increases the contact pressure between the liner 2 and the inner groove wall 50, which provides a sealing effect that helps to prevent undesirable elastomer migration between the liner 2 and the inner groove wall 50.

Description of FIG. 5

Referring now to the fragmentary longitudinal cross-section of FIG. 5, any suitable conventional molding process is used to introduce elastomer 58 into the mold cavity 32. The elastomer 58 is preferably introduced into the mold cavity 32 as an un-vulcanized elastomer compound. The pressure and temperature of the molding process vulcanizes the elastomer 58 and in conjunction with the previously mentioned bonding agent bonds the elastomer 58 to the liner 2. The pressure and temperature of the molding process also remolds the liner inner surface 4 of the liner 2 to a shape that closely approximates the shape of the lip forming surface 54 of the mold cavity 32. In accordance with the teachings of Patent Application Publication No. US 2018/0335146 A1 ("the '146 Publication"), the length and flexibility of the liner 2 help to prevent undesirable elastomer migration between the liner 2 and the lip forming surface 54 during the molding process. Additionally, the preferred and previously mentioned draft (taper) of the inner groove wall 50 tends to concentrate contact between the liner 2 and the inner groove wall 50 at the portion of the liner 2 that is nearest the first liner end surface 8, which also helps to prevent the elastomer 58 from migrating between the liner 2 and the mold core 24.

Examples of suitable molding processes are compression molding, transfer molding, and injection molding. In compression molding, the mold collar 26 is installed onto the mold core 24, and then a preferably annular un-vulcanized elastomer preform is inserted into the remaining portion of the mold cavity 32 such that part of the preform is located radially between the liner 2 and the collar cavity surface 42. The mold cap 28 is then installed on top of the preform, and the mold is inserted into a press that forces the mold cap 28 to the closed position shown in FIG. 5. The closing of the mold cap 28 and the thermal expansion of the elastomer 58 produce the necessary molding pressure within the elastomer 58. Preferably, the compression molding operation is performed in a vacuum press, to prevent air entrapment within the mold cavity 32.

In transfer molding, a mechanical device, such as a piston or platen, forces un-vulcanized elastomer into the mold cavity 32 through one or more entry passages that are not shown in FIG. 5, but are well understood by those skilled in the art. One type of entry passage into the mold cavity 32 is a plurality of sprue holes that are generally axially oriented. Another type of entry passage into the mold cavity 32 is known as a ring gate and can take the form of a small clearance between two mold components—such as a small clearance between a portion of the collar end surface 38 and a portion of the cap wall 36, or such as a small clearance between a portion of the locating surface 41 and a portion of the collar shoulder 40. The transfer process, and the thermal expansion of the elastomer 58 produce the necessary molding pressure. With ring gate transfer molding, the elastomer 58 is typically fed into the small clearance from a distribution groove (not shown) that is radially outward of the small clearance.

The molded rotary seal, shown generally at 60, is formed from elastomer 58 bonded to the plastic liner 2. Preferably, the rotary seal 60 has a generally circular, ring-shaped configuration. The rotary seal 60 preferably has a lubricant end 62 that is shaped by the mold shoulder 44 and faces in a generally axial direction away from the cap wall 36. Preferably, the rotary seal 60 has an environment end 64 that faces in a generally axial direction away from the lubricant end 62 and is shaped by the cap wall 36. Preferably, the lubricant end 62 and the environment end 64 face in opposite directions, away from each other. Preferably, the second liner end surface 10 forms an inner part of the environment end 64, however tests have shown no performance impact when a thin layer of elastomer leaks into the region between the second liner end surface 10 and the cap wall 36 to form a part of the environment end 64. Although the lubricant end 62 and the environment end 64 are illustrated as being flat, they can take other specific forms without departing from the spirit or scope of the invention. For example, although the lubricant end 62 and the environment end 64 are shown to be generally parallel to one another, they need not be parallel to one another.

Preferably, the rotary seal 60 has a body outer surface 66 that is shaped by the body forming surface 42A and faces in a radially outward direction. Preferably, the rotary seal 60 has a projecting static lip 68 that projects radially outward relative to the body outer surface 66 in accordance with the teachings of commonly assigned U.S. Pat. No. 5,230,520. Preferably, the static lip 68 has a static sealing surface 70 that faces in a generally radially outward direction and is shaped by the static lip forming surface 42B. Preferably, the static lip 68 has a lip flank 71 that is shaped by the flank forming surface 42C.

Preferably, the rotary seal 60 has a relief groove surface 72 that faces in a generally axial direction away from the environment end 64 and is shaped by the raised cavity surface 45. The relief groove surface 72 is preferably part of a relief groove 73. Preferably, the rotary seal 60 has an axial extension 74 that is shaped by the cavity groove 46 and projects in a generally axial direction, projecting axially beyond the lubricant end 62 and projecting generally away from the environment end 64.

Preferably, the axial extension 74 is formed in part by an inward surface 76 that is shaped by the inner groove wall 50 and faces in a generally inward radial direction. Preferably, the axial extension 74 has an outward surface 78 that is shaped by the outer groove wall 52 and faces in generally outward radial direction. Preferably, the inward surface 76 and the outward surface 78 face generally away from each another, the inward surface 76 facing away from the outward surface 78, and the outward surface 78 facing away from the inward surface 76. Preferably, the axial extension 74 has an extension end surface 79 shaped by the cavity groove end 48 and faces in a generally axial direction, away from the environment end 64. Preferably, a portion of the liner 2 forms at least part of the inward surface 76. Preferably, the inward surface 76 is located radially inward of and encircled by the lubricant end 62.

If desired, the inward surface 76 and the outward surface 78 can have draft angles (making them non-parallel), as shown, to facilitate the demolding process (i.e., removing the molded rotary seal 60 from the mold 22). Preferably the draft of the inward surface 76 and the outward surface 78 causes the extension end surface 79 of the axial extension 74 to be radially narrower than the portion of the axial extension 74 that is nearest to the lubricant end 62. Preferably, the radial distance separating the inward surface 76 and the outward surface 78 is greatest at the end of the axial extension 74 that is nearest to the environment end 64, and greater than the radial distance separating the inward surface 76 and the outward surface 78 at the end of the axial extension 74 that is most distant from the environment end 64.

Preferably, the rotary seal 60 has a dynamic lip 80 that projects radially inward relative to the inward surface 76. Preferably the dynamic lip 80 has a dynamic sealing surface 82 that is shaped by the periphery forming surface 54D and faces in a generally radially inward direction and faces generally away from the static sealing surface 70, and preferably, the static sealing surface 70 faces in a generally radially outward direction away from the dynamic sealing surface 82. Preferably the dynamic sealing surface 82 varies in axial width around the rotary seal 60, as taught by U.S. Pat. No. 7,562,878. Preferably, the dynamic sealing surface 82 is generally circular in form; i.e., generally circumferential.

Preferably the dynamic lip 80 has a dimple flank 84 in accordance with the teachings of U.S. Pat. No. 7,562,878 that is shaped by the flank forming surface 54A. Preferably, the dimple flank 84 is convex when viewed in longitudinal cross-section. Preferably, the rotary seal 60 has a dimple 86 in accordance with the teachings of U.S. Pat. No. 7,562,878 that is shaped by the dimple forming surface 54B. Preferably, the dimple 86 is concave when viewed in longitudinal cross-section. Preferably, at least a portion of the dimple 86 has a sloping profile in a circumferential direction, relative to the dynamic sealing surface 82, forming a smooth transition with the dynamic sealing surface 82 in a circumferential direction.

Preferably the dynamic lip 80 has a multi-function edge 88 in accordance with the teachings of U.S. Pat. No. 7,562,878 that is shaped by the edge forming surface 54C. Preferably, the multi-function edge 88 is convex when viewed in longitudinal cross-section, extends in a generally circumferential direction, and varies in axial location around the rotary seal 60, as taught by U.S. Pat. No. 7,562,878, such that the multi-function edge 88 is skewed with respect to the environment end 64, and some circumferential portions of the multi-function edge 88 are closer to the environment end 64 than other circumferential portions. Preferably, some circumferential portions of the multi-function edge 88 vary in radial location to form the ramp sections that are described in U.S. Pat. No. 7,562,878, such that the ramp section curves radially outward from the level of the dynamic sealing surface 82 causing a portion of the ramp section to be recessed relative to the dynamic sealing surface 82. Preferably, the liner 2 forms the dynamic sealing surface 82, dimple flank 84, dimple 86, and multi-function edge 88.

Preferably, the lubricant end 62, environment end 64, body outer surface 66, static sealing surface 70, lip flank 71, inward surface 76, outward surface 78, and dynamic sealing surface 82 are annular surfaces. Preferably, the dynamic lip 80, relief groove 72, static lip 68, and axial extension 74 are annular features. Preferably, the rotary seal 60 is an annular component.

Preferably, the dimple flank 84 adjoins and is substantially tangent to the dynamic sealing surface 82 and the dimple 86. Preferably, the dimple 86 adjoins and is substantially tangent to the multi-function edge 88.

Preferably, the environment end 64 intersects and adjoins the dynamic sealing surface 82, forming an external corner 90 that is annular. Preferably, the axial distance between the annular external corner 90 and the multi-function edge 88 varies around the rotary seal 60. Preferably, the environment end 64 intersects and adjoins the static sealing surface 70 forming an annular outside corner at the intersection. Preferably, the static sealing surface 70 intersects and adjoins the lip flank 71, forming an annular outside corner at the intersection. Preferably, the lip flank 71 intersects and adjoins the body outer surface 66, forming an annular inside corner at the intersection. Preferably, the body outer surface 66 intersects and adjoins the lubricant end 62, forming an annular outside corner at the intersection. Preferably, the relief groove surface 72 intersects and adjoins the outward surface 78, forming an annular inside corner at the intersection. Preferably, the outward surface 78 intersects and adjoins the extension end surface 79, forming an annular outside corner at the intersection. Preferably, the extension end surface 79 intersects and adjoins the inward surface 76, forming an annular external corner at the intersection.

Persons skilled in the art understand that corners seldom, if ever, achieve theoretically perfect intersections, when viewed under magnification. Persons skilled in the art also understand that corners can be intentionally rounded, resulting in what are known as rounded corners, or in the case of inside corners, fillets. Inside corners on molded components are created by outside corners of the mold cavity. The outside corners of the mold cavity can become rounded from the abrasive effect of the material being molded, which produces corresponding fillets on the inside corners.

Lest the reader be confused by terms such as external corner, outside corner, internal corner and inside corner, an example is provided. Imagine a large cube-shaped empty box made of opaque material. From a point of observation that is located inside the box, all the corners that you can see are what are known in the engineering, manufacturing, and building trades as internal corners, or inside corners. From a point of observation that is located outside the box, all you can see are what are known in the engineering, manufacturing, and building trades as external corners, or outside corners. As a further clarification, a solid cube only has external (outside) corners and has no inside (internal) corners.

Preferably, the inward surface 76 is positioned in axially intermediate relation to the extension end surface 79 and the multi-function edge 88. Preferably, the inward surface 76 is positioned in axially intermediate relation to the extension end surface 79 and the dimple 86. Preferably, the inward surface 76 is positioned in axially intermediate relation to the extension end surface 79 and the dimple flank 84. Preferably, the inward surface 76 is positioned in axially intermediate relation to the extension end surface 79 and the dynamic sealing surface 82. Preferably, the inward surface 76 is positioned in axially intermediate relation to the extension end surface 79 and the environment end 64.

Preferably, the outward surface 78 is positioned in axially intermediate relation to the extension end surface 79 and the multi-function edge 88. Preferably, the outward surface 78 is positioned in axially intermediate relation to the extension end surface 79 and the dimple 86. Preferably, the outward surface 78 is positioned in axially intermediate relation to the extension end surface 79 and the dimple flank 84. Preferably, the outward surface 78 is positioned in axially intermediate relation to the extension end surface 79 and the dynamic sealing surface 82. Preferably, the outward surface 78 is positioned in axially intermediate relation to the extension end surface 79 and the environment end 64. Preferably, the outward surface 78 is positioned in axially intermediate relation to the extension end surface 79 and the relief groove surface 72. Preferably, the outward surface 78 is positioned in axially intermediate relation to the extension end surface 79 and the lip flank 71. Preferably, the outward surface 78 is positioned in axially intermediate relation to the extension end surface 79 and the static sealing surface 70.

Preferably, the relief groove surface 72 is positioned in axially intermediate relation to the extension end surface 79 and the multi-function edge 88. Preferably, the relief groove surface 72 is positioned in axially intermediate relation to the extension end surface 79 and the dimple 86. Preferably, the relief groove surface 72 is positioned in axially intermediate relation to the extension end surface 79 and the dimple flank 84. Preferably, the relief groove surface 72 is positioned in axially intermediate relation to the extension end surface 79 and the dynamic sealing surface 82. Preferably, the relief groove surface 72 is positioned in axially intermediate relation to the extension end surface 79 and the environment end 64. Preferably, the relief groove surface 72 is positioned in axially intermediate relation to the extension end surface 79 and the lip flank 71. Preferably, the relief groove surface 72 is positioned in axially intermediate relation to the extension end surface 79 and the static sealing surface 70.

Preferably, the relief groove surface 72 is positioned in axially intermediate relation to the outward surface 78 and the multi-function edge 88. Preferably, the relief groove surface 72 is positioned in axially intermediate relation to the outward surface 78 and the dimple 86. Preferably, the relief groove surface 72 is positioned in axially intermediate relation to the outward surface 78 and the dimple flank 84. Preferably, the relief groove surface 72 is positioned in axially intermediate relation to the outward surface 78 and the dynamic sealing surface 82. Preferably, the relief groove surface 72 is positioned in axially intermediate relation to the outward surface 78 and the environment end 64. Preferably, the relief groove surface 72 is positioned in axially intermediate relation to the outward surface 78 and the lip flank 71. Preferably, the relief groove surface 72 is positioned in axially intermediate relation to the outward surface 78 and the static sealing surface 70.

Preferably, at least a portion of the relief groove surface 72 is positioned in axially intermediate relation to the lubricant end 62 and the lip flank 71. Preferably, at least a portion of the relief groove surface 72 is positioned in axially intermediate relation to the lubricant end 62 and the static sealing surface 70. Preferably, at least a portion of the relief groove surface 72 is positioned in axially intermediate relation to the lubricant end 62 and the environment end 64. Preferably, at least a portion of the relief groove surface 72 is positioned in axially intermediate relation to the lubricant end 62 and the dimple flank 84. Preferably, at least a portion of the relief groove surface 72 is positioned in axially intermediate relation to the lubricant end 62 and the dynamic sealing surface 82.

Preferably, the lubricant end 62 is positioned in axially intermediate relation to the extension end surface 79 and the body outer surface 66. Preferably, the lubricant end 62 is positioned in axially intermediate relation to the extension end surface 79 and the lip flank 71. Preferably, the lubricant end 62 is positioned in axially intermediate relation to the extension end surface 79 and the static sealing surface 70. Preferably, the lubricant end 62 is positioned in axially intermediate relation to the extension end surface 79 and the environment end 64. Preferably, the lubricant end 62 is positioned in axially intermediate relation to the extension end surface 79 and the dynamic sealing surface 82. Preferably, the lubricant end 62 is positioned in axially intermediate relation to the extension end surface 79 and the dimple flank 84.

Preferably, the body outer surface 66 is positioned in axially intermediate relation to the extension end surface 79 and the environment end 64. Preferably, the body outer surface 66 is positioned in axially intermediate relation to the extension end surface 79 and the lip flank 71. Preferably, the body outer surface 66 is positioned in axially intermediate relation to the lubricant end 62 and the environment end 64. Preferably the body outer surface 66 is positioned in axially intermediate location to the lip flank 71 and the lubricant end 62.

Preferably, the lip flank 71 is positioned in axially intermediate relation to the body outer surface 66 and the static sealing surface 70. Preferably, the lip flank 71 is positioned in axially intermediate relation to the extension end surface 79 and the environment end 64. Preferably, the lip flank 71 is positioned in axially intermediate relation to the extension end surface 79 and the static sealing surface 70. Preferably, the lip flank 71 is positioned in axially intermediate relation to the lubricant end 62 and the environment end 64.

Preferably, the static sealing surface 70 is positioned in axially intermediate relation to the extension end surface 79 and the environment end 64. Preferably, the static sealing surface 70 is positioned in axially intermediate relation to the lip flank 71 and the environment end 64. Preferably, the static sealing surface 70 is positioned in axially intermediate relation to the lubricant end 62 and the environment end 64.

Preferably, the multi-function edge 88 is positioned in axially intermediate relation to the extension end surface 79 and the dimple 86 when viewed in longitudinal cross-section. Preferably, the multi-function edge 88 is positioned in axially intermediate relation to the extension end surface 79 and the dimple flank 84 when viewed in longitudinal cross-section. Preferably, the multi-function edge 88 is positioned in axially intermediate relation to the extension end surface 79 and the dynamic scaling surface 82 when viewed in longitudinal cross-section. Preferably, the multi-function edge 88 is positioned in axially intermediate relation to the extension end surface 79 and the environment end 64. Preferably, the multi-function edge 88 is positioned in axially intermediate relation to the inward surface 76 and the dimple 86 when viewed in longitudinal cross-section. Preferably, the multi-function edge 88 is positioned in axially intermediate relation to the inward surface 76 and the dimple flank 84 when viewed in longitudinal cross-section. Preferably, the multi-function edge 88 is positioned in axially intermediate relation to the inward surface 76 and the dynamic sealing surface 82 when viewed in longitudinal cross-section. Preferably, the multi-function edge 88 is positioned in axially intermediate relation to the inward surface 76 and the environment end 64. Preferably, the multi-function edge 88 is positioned in axially intermediate relation to the lubricant end 62 and the dimple 86 when viewed in longitudinal cross-section. Preferably, the multi-function edge 88 is positioned in axially intermediate relation to the lubricant end 62 and the dimple flank 84 when viewed in longitudinal cross-section. Preferably, the multi-function edge 88 is positioned in axially intermediate relation to the lubricant end 62 and the dynamic sealing surface 82 when viewed in longitudinal cross-section. Preferably, the multi-function edge 88 is positioned in axially intermediate relation to the lubricant end 62 and the environment end 64.

Preferably, the dimple 86 is positioned in axially intermediate relation to the multi-function edge 88 and the dimple flank 84 when viewed in longitudinal cross-section. Preferably, the dimple 86 is positioned in axially intermediate relation to the inward surface 76 and the dynamic sealing surface 82 when viewed in longitudinal cross-section. Preferably, the dimple 86 is positioned in axially intermediate relation to the extension end surface 79 and the environment end 64. Preferably, the dimple 86 is positioned in axially intermediate relation to the outward surface 78 and the dimple flank 84 when viewed in longitudinal cross-section. Preferably, the dimple 86 is positioned in axially intermediate relation to the extension end surface 79 and the dimple flank 84 when viewed in longitudinal cross-section. Preferably, the dimple 86 is positioned in axially intermediate relation to the inward surface 76 and the dimple flank 84 when viewed in longitudinal cross-section.

Preferably, the dimple flank 84 is positioned in axially intermediate relation to the dimple 86 and the dynamic sealing surface 82 when viewed in longitudinal cross-section. Preferably, the dimple flank 84 is positioned in axially intermediate relation to the environment end 64 and the multi-function edge 88 when viewed in longitudinal cross-section. Preferably, the dimple flank 84 is positioned in axially intermediate relation to the dynamic sealing surface 82 and the inward surface 76 when viewed in longitudinal cross-section. Preferably, the dimple flank 84 is positioned in axially intermediate relation to the dynamic sealing surface 82 and the extension end surface 79 when viewed in longitudinal cross-section. Preferably, the dimple flank 84 is positioned in axially intermediate relation to the dynamic sealing surface 82 and the outward surface 78 when viewed in longitudinal cross-section. Preferably, the dimple flank 84 is positioned in axially intermediate relation to the dynamic sealing surface 82 and the lubricant end 62 when viewed in longitudinal cross-section.

Preferably the radial distance between at least a portion of the dimple flank 84 and the theoretical axis 20 is greater than the radial distance between the dynamic sealing surface 82 and the theoretical axis 20. Preferably the radial distance between at least a portion of the dimple 86 and the theoretical axis 20 is greater than the radial distance between the dynamic sealing surface 82 and the theoretical axis 20. Preferably the radial distance between at least a portion of the multi-function edge 88 and the theoretical axis 20 is greater than the radial distance between the dynamic sealing surface 82 and the theoretical axis 20. Preferably the radial distance between the inward surface 76 and the theoretical axis 20 is greater than the radial distance separating the dynamic sealing surface 82 and the theoretical axis 20. Preferably the radial distance between the extension end surface 79 and the theoretical axis 20 is greater than the radial distance separating the dynamic sealing surface 82 from the theoretical axis 20. Preferably the radial distance between the outward surface 78 and the theoretical axis 20 is greater than the radial distances separating the extension end surface 79, dynamic sealing surface 82, and the inward surface 76 from the theoretical axis 20.

Preferably the radial distance between the relief groove surface 72 and the theoretical axis 20 is greater than the radial distances separating the extension end surface 79, dynamic sealing surface 82, outward surface 78, and the inward surface 76 from the theoretical axis 20. Preferably the radial distance between the lubricant end 62 and the theoretical axis 20 is greater than the radial distances separating the relief groove surface 72, outward surface 78, extension end surface 79, dynamic sealing surface 82, and the inward surface 76 from the theoretical axis 20. Preferably the radial distance between the body outer surface 66 and the theoretical axis 20 is greater than the radial distances separating the relief groove surface 72, outward surface 78, extension end surface 79, dynamic sealing surface 82, and the inward surface 76 from the theoretical axis 20. Preferably the radial distance between the lip flank 71 and the theoretical axis 20 is greater than the radial distances separating the relief groove surface 72, outward surface 78, extension end surface 79, dynamic sealing surface 82, and the inward surface 76 from the theoretical axis 20. Preferably the radial distance between the static sealing surface 70 and the theoretical axis 20 is greater than the radial distances separating the pilot surface 34, body outer surface 66, relief groove surface 72, outward surface 78, extension end surface 79, dynamic sealing surface 82, lip flank 71, and the inward surface 76 from the theoretical axis 20.

Preferably the radial distance between the relief groove 73 and the theoretical axis 20 is greater than the radial distances separating the extension end surface 79, dynamic sealing surface 82, outward surface 78, and the inward surface 76 from the theoretical axis 20. Preferably the radial distance between the lubricant end 62 and the theoretical axis 20 is greater than the radial distances separating the relief groove 73 from the theoretical axis 20. Preferably the radial distance between the body outer surface 66 and the theoretical axis 20 is greater than the radial distance separating the relief groove 73 from the theoretical axis 20. Preferably the radial distance between the lip flank 71 and the theoretical axis 20 is greater than the radial distance separating the relief groove 73 from the theoretical axis 20. Preferably the radial distance between the static sealing surface 70 and the theoretical axis 20 is greater than the radial distance separating the relief groove 73 from the theoretical axis 20.

Preferably, the inward surface 76 is positioned in radially intermediate location to the dynamic sealing surface 82 and the outward surface 78. Preferably, the inward surface 76 is positioned in radially intermediate location to the dynamic sealing surface 82 and the relief groove surface 72. Preferably, the inward surface 76 is positioned in radially intermediate location to the dynamic sealing surface 82 and the lubricant end 62. Preferably, the inward surface 76 is positioned in radially intermediate location to the dynamic sealing surface 82 and the body outer surface 66. Preferably, the inward surface 76 is positioned in radially intermediate location to the dynamic sealing surface 82 and the static sealing surface 70.

Preferably, the axial extension 74 is positioned in radially intermediate location to the dynamic sealing surface 82 and the relief groove surface 72. Preferably, the axial extension 74 is positioned in radially intermediate location to the dynamic sealing surface 82 and the lubricant end 62. Preferably, the axial extension 74 is positioned in radially intermediate location to the dynamic sealing surface 82 and the body outer surface 66. Preferably, the axial extension 74 is positioned in radially intermediate location to the dynamic sealing surface 82 and the static sealing surface 70.

Preferably, the outward surface 78 is positioned in radially intermediate location to the dynamic sealing surface 82 and the relief groove surface 72. Preferably, the outward surface 78 is positioned in radially intermediate location to the dynamic sealing surface 82 and the lubricant end 62. Preferably, the outward surface 78 is positioned in radially intermediate location to the dynamic sealing surface 82 and the body outer surface 66. Preferably, the outward surface 78 is positioned in radially intermediate location to the dynamic sealing surface 82 and the static sealing surface 70.

Preferably, the outward surface 78 is positioned in radially intermediate location to the inward surface 76 and the relief groove surface 72. Preferably, the outward surface 78 is positioned in radially intermediate location to the inward surface 76 and the lubricant end 62. Preferably, the outward surface 78 is positioned in radially intermediate location to the inward surface 76 and the body outer surface 66. Preferably, the outward surface 78 is positioned in radially intermediate location to the inward surface 76 and the static sealing surface 70.

Preferably, the outward surface 78 is positioned in radially intermediate location to the extension end surface 79 and the relief groove surface 72. Preferably, the outward surface 78 is positioned in radially intermediate location to the extension end surface 79 and the lubricant end 62. Preferably, the outward surface 78 is positioned in radially intermediate location to the extension end surface 79 and the body outer surface 66. Preferably, the outward surface 78 is positioned in radially intermediate location to the extension end surface 79 and the static sealing surface 70.

Preferably, the relief groove surface 72 is positioned in radially intermediate location to the lubricant end 62 and the outward surface 78. Preferably, the relief groove surface 72 is positioned in radially intermediate location to the lubricant end 62 and the extension end surface 79. Preferably, the relief groove surface 72 is positioned in radially intermediate location to the lubricant end 62 and the axial extension 74. Preferably, the relief groove surface 72 is positioned in radially intermediate location to the lubricant end 62 and the inward surface 76. Preferably, the relief groove surface 72 is positioned in radially intermediate location to the lubricant end 62 and the dimple flank 84. Preferably, the relief groove surface 72 is positioned in radially intermediate location to the lubricant end 62 and the dimple 86. Preferably, the relief groove surface 72 is positioned in radially intermediate location to the lubricant end 62 and the multi-function edge 88. Preferably, the relief groove surface 72 is positioned in radially intermediate location to the lubricant end 62 and the dynamic sealing surface 82.

Preferably, the relief groove surface 72 is positioned in radially intermediate location to the body outer surface 66 and the outward surface 78. Preferably, the relief groove surface 72 is positioned in radially intermediate location to the body outer surface 66 and the extension end surface 79. Preferably, the relief groove surface 72 is positioned in radially intermediate location to the body outer surface 66 and the axial extension 74. Preferably, the relief groove surface 72 is positioned in radially intermediate location to the body outer surface 66 and the inward surface 76. Preferably, the relief groove surface 72 is positioned in radially intermediate location to the body outer surface 66 and the dimple flank 84. Preferably, the relief groove surface 72 is positioned in radially intermediate location to the body outer surface 66 and the dimple 86. Preferably, the relief groove surface 72 is positioned in radially intermediate location to the body outer surface 66 and the multi-function edge 88. Preferably, the relief groove surface 72 is positioned in radially intermediate location to the body outer surface 66 and the dynamic sealing surface 82.

Preferably, the relief groove surface 72 is positioned in radially intermediate location to the static sealing surface 70 and the outward surface 78. Preferably, the relief groove surface 72 is positioned in radially intermediate location to the static sealing surface 70 and the extension end surface 79. Preferably, the relief groove surface 72 is positioned in radially intermediate location to the static sealing surface 70 and the axial extension 74. Preferably, the relief groove surface 72 is positioned in radially intermediate location to the static sealing surface 70 and the inward surface 76. Preferably, the relief groove surface 72 is positioned in radially intermediate location to the static sealing surface 70 and the dimple flank 84. Preferably, the relief groove surface 72 is positioned in radially intermediate location to the static sealing surface 70 and the dimple 86. Preferably, the relief groove surface 72 is positioned in radially intermediate location to the static sealing surface 70 and the multi-function edge 88. Preferably, the relief groove surface 72 is positioned in radially intermediate location to the static sealing surface 70 and the dynamic sealing surface 82.

Preferably the inward surface 76 is located radially intermediate to the dynamic sealing surface 82 and the extension end surface 79. Preferably the extension end surface 79 is located radially intermediate to and between the inward surface 76 and the outward surface 78. Preferably, the outward surface 78 is located radially intermediate to and between the extension end surface 79 and the relief groove surface 72. Preferably, the relief groove surface 72 is located radially intermediate to the outward surface 78 and the lubricant end 62. Preferably, the lubricant end 62 is located radially intermediate to the relief groove surface 72 and the body outer surface 66. Preferably, the lip flank 71 is located radially intermediate to the body outer surface 66 and the static sealing surface 70. Preferably, the environment end 64 is located radially intermediate to the static sealing surface 70 and the dynamic sealing surface 82.

Preferably, the outward surface 78 is located radially outward of and encircles at least a portion of the inward surface 76. Preferably, the inward surface 76 is located radially inward from and is encircled by at least a portion of the outward surface 78. Preferably, at least a portion of the body outer surface 66 is located radially outward of and encircles at least a portion of the inward surface 76. Preferably, at least a portion of the inward surface 76 is located radially inward of and is encircled by at least a portion of the body outer surface 66. Preferably, at least a portion of the static sealing surface 70 is located radially outward of and encircles at least a portion of the dynamic sealing surface 82. Preferably, at least a portion of the dynamic sealing surface 82 is located radially inward of and is encircled by at least a portion of the static sealing surface 70. Preferably, the lubricant end 62 is located radially outward of and encircles a portion of the inward surface 76 and a portion of the liner 2. Preferably, the relief groove surface 72 is located radially outward of and encircles a portion of the inward surface 76 and a portion of the liner 2.

Preferably, the inward surface 76 is positioned in radially intermediate location to the dynamic sealing surface 82 and the relief groove 73. Preferably, the axial extension 74 is positioned in radially intermediate location to the dynamic sealing surface 82 and the relief groove 73. Preferably, the outward surface 78 is positioned in radially intermediate location to the dynamic sealing surface 82 and the relief groove 73. Preferably, the outward surface 78 is positioned in radially intermediate location to the inward surface 76 and the relief groove 73. Preferably, the outward surface 78 is positioned in radially intermediate location to the extension end surface 79 and the relief groove 73.

Preferably, the relief groove 73 is positioned in radially intermediate location to the lubricant end 62 and the outward surface 78. Preferably, the relief groove 73 is positioned in radially intermediate location to the lubricant end 62 and the extension end surface 79. Preferably, the relief groove 73 is positioned in radially intermediate location to the lubricant end 62 and the axial extension 74. Preferably, the relief groove 73 is positioned in radially intermediate location to the lubricant end 62 and the inward surface 76. Preferably, the relief groove 73 is positioned in radially intermediate location to the lubricant end 62 and the dimple flank 84. Preferably, the relief groove 73 is positioned in radially intermediate location to the lubricant end 62 and the dimple 86. Preferably, the relief groove 73 is positioned in radially intermediate location to the lubricant end 62 and the multi-function edge 88. Preferably, the relief groove 73 is positioned in radially intermediate location to the lubricant end 62 and the dynamic sealing surface 82.

Preferably, the relief groove 73 is positioned in radially intermediate location to the body outer surface 66 and the outward surface 78. Preferably, the relief groove 73 is positioned in radially intermediate location to the body outer surface 66 and the extension end surface 79. Preferably, the relief groove 73 is positioned in radially intermediate location to the body outer surface 66 and the axial extension 74. Preferably, the relief groove 73 is positioned in radially intermediate location to the body outer surface 66 and the inward surface 76. Preferably, the relief groove 73 is positioned in radially intermediate location to the body outer surface 66 and the dimple flank 84. Preferably, the relief groove 73 is positioned in radially intermediate location to the body outer surface 66 and the dimple 86. Preferably, the relief groove 73 is positioned in radially intermediate location to the body outer surface 66 and the multi-function edge 88. Preferably, the relief groove 73 is positioned in radially intermediate location to the body outer surface 66 and the dynamic sealing surface 82.

Preferably, the relief groove 73 is positioned in radially intermediate location to the static sealing surface 70 and the outward surface 78. Preferably, the relief groove 73 is positioned in radially intermediate location to the static sealing surface 70 and the extension end surface 79. Preferably, the relief groove 73 is positioned in radially intermediate location to the static sealing surface 70 and the axial extension 74. Preferably, the relief groove 73 is positioned in radially intermediate location to the static sealing surface 70 and the inward surface 76. Preferably, the relief groove 73 is positioned in radially intermediate location to the static sealing surface 70 and the dimple flank 84. Preferably, the relief groove 73 is positioned in radially intermediate location to the static sealing surface 70 and the dimple 86. Preferably, the relief groove 73 is positioned in radially intermediate location to the static sealing surface 70 and the multi-function edge 88. Preferably, the relief groove 73 is positioned in radially intermediate location to the static sealing surface 70 and the dynamic sealing surface 82. Preferably, the outward surface 78 is located radially intermediate to and between the extension end surface 79 and the relief groove 73. Preferably, the relief groove 73 is located radially intermediate to the outward surface 78 and the lubricant end 62. Preferably, the lubricant end 62 is located radially intermediate to the relief groove 73 and the body outer surface 66. Preferably, the relief groove 73 is located radially outward of and encircles a portion of the inward surface 76 and a portion of the liner 2.

Figure 6:
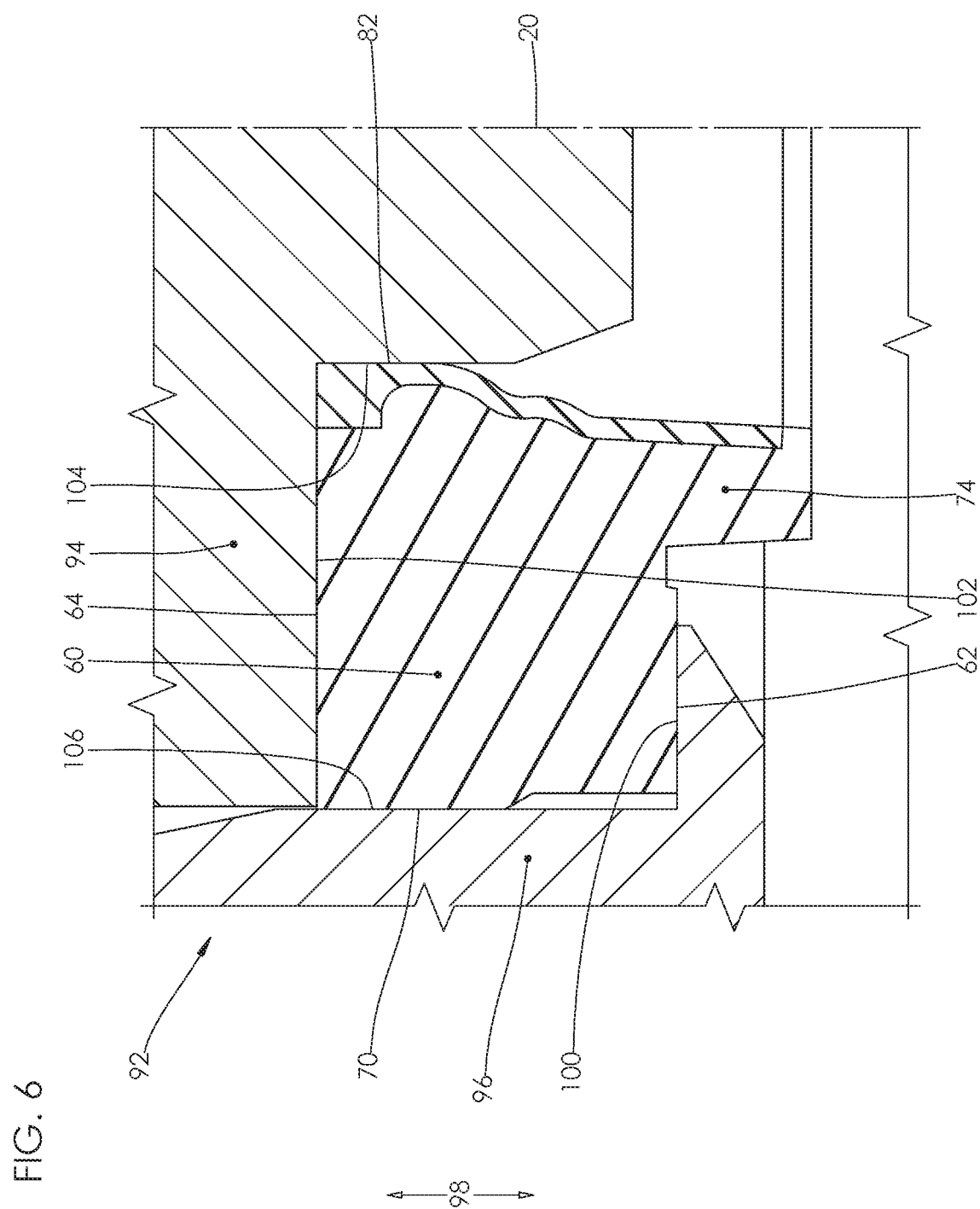
FIG. 6 is a fragmentary, longitudinal cross-sectional view of a seal machining fixture according to a preferred embodiment of the invention, with a seal positioned in the seal machining fixture.

Description of FIG. 6

Referring now to the fragmentary longitudinal cross-section of FIG. 6, a seal machining fixture is shown generally at 92. Preferably, the seal machining fixture 92 includes a holder 94 and at least one clamp 96. Preferably, during the machining operation, the holder 94 is clamped in the jaws of a lathe (which is not shown) or any convenient bearing guided arrangement that allows rotation of the seal machining fixture 92 about the theoretical axis 20. Preferably, the clamp 96 is adjustable in the axial directions 98 relative to the holder 94 so that the rotary seal 60 can be clamped between a clamping surface 100 of the clamp 96 and a reaction surface 102 of the holder 94. The clamping action can be achieved with any suitable arrangement, such as a thread between the holder 94 and the clamp 96, or a pattern of threaded fasteners, or by one or more cams (such as toggles), or by one or more pneumatic pistons, or through the use of springs. When the rotary seal 60 is fixtured for machining, the clamping surface 100 preferably contacts and pushes against the lubricant end 62, and holds the environment end 64 against the reaction surface 102, providing enough constraint to prevent the rotary seal from turning within or tearing loose from the seal machining fixture 92. Preferably, the axial extension 74 is oriented away from the reaction surface 102, placing the axial extension 74 in a position to be accessed by a machine tool.

Preferably, the holder 94 has a pilot surface 104 that serves to locate the rotary seal 60 in the lateral direction. Preferably, the clamp 96 has a clamp guide surface 106 that also helps to locate the rotary seal 60 in the lateral direction. It should be understood that due to the resiliency of the elastomer portion of the rotary seal 60, the rotary seal 60 can, if desired, be compressed radially between the pilot surface 104 and the clamp guide surface 106 during the machining process. Such radial compression is not necessary, however, and the seal need not be held to a perfect circular configuration during the machining operation. For ease of fixturing, the fixture can allow some radial clearance between the rotary seal 60 and the clamp guide surface 106, if desired. For ease of fixturing, the fixture can allow some radial clearance between the rotary seal 60 and the pilot surface 104, if desired.

Preferably, the pilot surface 104 is annular in form and faces generally in a radially outward direction toward the dynamic sealing surface 82 and the clamp guide surface 106 and is encircled by the dynamic sealing surface 82 and the clamp guide surface 106. Preferably, the dynamic sealing surface 82 faces in a generally radially inward direction towards and is located radially by the pilot surface 104. Preferably, the clamp guide surface 106 is annular in form and faces generally radially inward towards the static sealing surface 70 and the pilot surface 104 and encircles the static sealing surface 70 and the pilot surface 104. Preferably, the static sealing surface 70 faces generally in a radially outward direction towards and is located radially by the clamp guide surface 106. Preferably, at least a portion of the rotary seal 60 is located radially between the pilot surface 104 and the clamp guide surface 106. Since the static sealing surface 70 may either touch or have a little clearance with the clamp guide surface 106, the static sealing surface 70 can be said to adjoin the clamp guide surface 106. Since the dynamic sealing surface 82 may either contact of have a little clearance with the pilot surface 104, the dynamic sealing surface 82 can be said to adjoin the pilot surface 104.

Preferably, the clamping surface 100 is annular in form and faces in a generally axial direction toward the lubricant end 62 and the reaction surface 102 and abuts the lubricant end 62. Preferably, the reaction surface 102 is annular in form and faces in a generally axial direction toward the environment end 64 and clamping surface 100 and abuts the environment end 64. Preferably, the clamping surface 100 and the reaction surface 102 face in generally opposite directions and toward each other. Preferably at least a portion of the rotary seal 60 is located between and clamped between the clamping surface 100 and the reaction surface 102.

Figure 7:
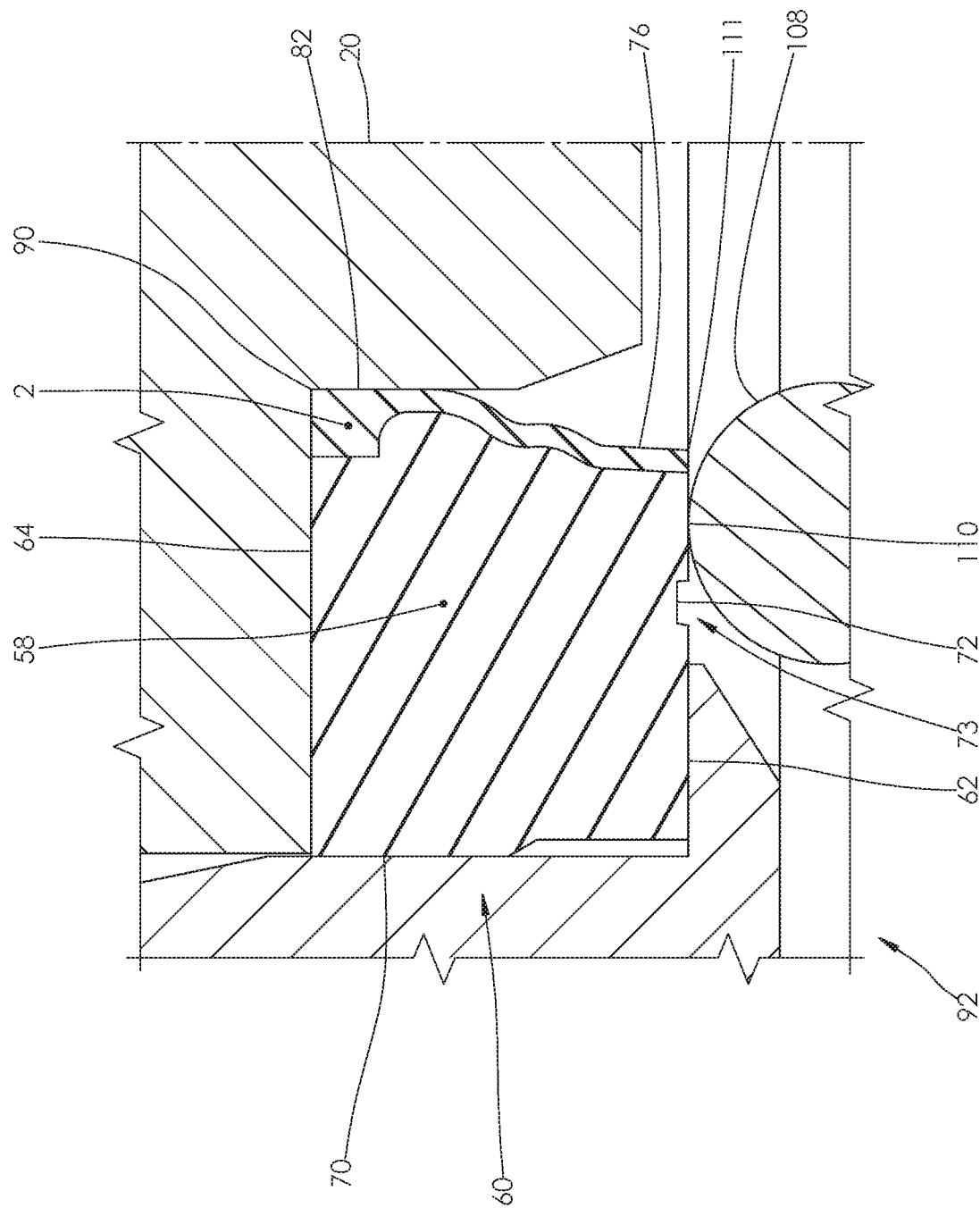
FIG. 7 is a fragmentary, longitudinal cross-sectional view of the seal machining fixture shown in FIG. 6, and a machining tool for removing some or all of an axial extension of the seal.

Description of FIG. 7

Referring now to the fragmentary longitudinal cross-section of FIG. 7, as the seal machining fixture 92 is rotated, a machining tool 108 is used to remove most or all of the axial extension that was shown in FIGS. 5 and 6, producing a machined seal surface 110. If present, the relief groove surface 72 provides a machining relief groove for this machining operation. (Optionally, the shallow groove of which the relief groove surface 72 is a portion of can be eliminated as a simplification.) Preferably, the lubricant end 62, environment end 64, and machined seal surface 110 are generally planar surfaces.

Preferably, the machined seal surface 110 is a substantially planar surface that is substantially level with the lubricant end 62. Preferably, the machined surface 110 is separated from the environment end 64 by a distance, and the distance separating the machined surface 110 from the environment end 64 is substantially the same as the distance separating the lubricant end 62 from the environment end 64.

Preferably, an outer portion of the machined seal surface 110 is formed by the elastomer 58 and an inner portion of the machined seal surface 110 is formed by the liner 2. Preferably, the machining operation removes a portion of the liner 2: i.e., preferably the machining operation truncates the liner 2. After the machining operation, the rotary seal 60 is relatively compact in the axial direction, to conserve critical axial space in the equipment it is used in.

Preferably, the liner 2, as machined, extends from the machined seal surface 110 to the environment end 64, and forms a portion of the environment end 64.

It can be appreciated that this machining operation requires less material removal to produce the finished rotary seal 60, compared to the machining operation described in commonly assigned Patent Application Publication No. US 2018/0335146 A1.

The machining tool 108 can be any appropriate machining tool for machining polymers. The preferred machining tool 108 is a grinding stone rotated by a high-speed grinding tool that is mounted to the tool post of a lathe. The preferred cutting speed is 8,000 rpm or greater. Examples of other appropriate tools are structured tooth tungsten carbide cutters, diamond wheels, high speed fluted cutters, sanding drums, and cut-off wheels.

Preferably, after the machining operation, the relief groove surface 72 is located in radially intermediate relation to the machined seal surface 110 and the lubricant end 62 and at least part of the relief groove surface 72 is located in axially intermediate relation to the lubricant end 62 and the environment end 64. Preferably, the relief groove 73 is located in radially intermediate relation to the machined seal surface 110 and the lubricant end 62 and at least part of the relief groove 73 is located in axially intermediate relation to the lubricant end 62 and the environment end 64.

Preferably, after the machining operation, the plastic liner 2 forms an inner body corner 111 at the inner edge of the machined seal surface 110, the inner body corner 111 being an outside corner. If desired, the inner body corner 111 can be an intersection between the machined seal surface 110 and the inward surface 76. Preferably, the inner body corner 111 is substantially parallel to the environment end 64. Preferably, the machining operation causes the liner 2 to terminate at the machined surface 110.

Preferably, the machining operation causes the axial distance between the machined seal surface 110 and the environment end 64 to be shorter than the axial distance between the environment end 64 and the extension end surface 79 that existed prior to the machining process.

The use of the rotary seal 60 is well known in the art and is only briefly described here. As an introduction, the rotary seal 60 is generally ring-shaped and is typically located by a machine component, and establishes dynamic or static sealing with a relatively rotatable surface, and serves as a partition between a lubricant of a lubricant supply and a second fluid typically referred to as the environment.

In use, the rotary seal 60 establishes sealing engagement with a relatively rotatable surface, to retain a volume of a lubricant, to partition the lubricant from an environment, and to exclude the environment and prevent intrusion of the environment into the lubricant. The rotary seal 60 is adapted for both static and dynamic sealing engagement with the relatively rotatable surface; i.e., the rotary seal 60 is adapted to form a sealing interface with the relatively rotatable surface. Preferably, the rotary seal 60 incorporates hydrodynamic features that allow it to hydroplane on a lubricant film during periods of relative rotation between the rotary seal 60 and the relatively rotatable surface, performing as a hydrodynamic rotary seal.

Preferably, the rotary seal 60 is a direct interference type of seal that is installed in radial compression between the relatively rotatable surface and the radially inward facing peripheral groove wall of a seal groove of a machine housing. The radial spacing between the relatively rotatable surface and the peripheral wall of the seal groove is preferably sized to hold the rotary seal 60 in radial compression.

The rotary seal 60 is typically positioned by the seal groove, and the seal groove is typically of generally circular form. The seal groove typically includes a lubricant-side groove wall and an environment-side groove wall that are in generally opposed relation to one another, and generally facing one another. The rotary seal is typically located axially between the lubricant-side groove wall and the environment-side groove wall and is typically located radially between the relatively rotatable surface and the peripheral groove wall.

Preferably, at least a portion of the dynamic sealing surface 82 is held in compressed, contacting relation with the relatively rotatable surface. The relatively rotatable surface is typically the radially outward facing surface of a shaft. In dynamic operation, the relatively rotatable surface has relative rotation with respect to the dynamic sealing surface 82.

Preferably, the lubricant end 62, relief groove surface 72, and machined seal surface 110 of the rotary seal 60 face in a generally axial direction toward the lubricant-side groove wall and the lubricant. Preferably, the environment end 64 of the rotary seal 60 faces in a generally axial direction toward the environment-side groove wall and the environment.

Preferably, the peripheral groove wall faces generally radially inward toward the rotary seal 60 and the relatively rotatable surface, and preferably the relatively rotatable surface faces generally radially outward toward the rotary seal 60 and the peripheral groove wall. The relatively rotatable surface and the peripheral groove wall are located in radially spaced relation to each other.

The relatively rotatable surface preferably takes the form of an externally oriented, substantially cylindrical surface, with the rotary seal 60 compressed radially between the peripheral groove wall and the relatively rotatable surface, with the axis of relative rotation being substantially parallel to the relatively rotatable surface. Preferably, the external corner 90 is substantially aligned with the direction of relative rotation.

During relative rotation, the shape of the rotary seal 60 causes a microscopic film of the lubricant to be forced between the relatively rotatable surface and the dynamic sealing surface 82 providing lubrication of the relatively rotatable surface and the dynamic sealing surface 82. This hydroplaning activity occurs as a result of the highly evolved geometry of the seal and minimizes or prevents the typical dry rubbing wear and high friction associated with non-hydrodynamic seals, prolonging the life of the rotary seal 60 and the life of the relatively rotatable surface.

Figure 8:
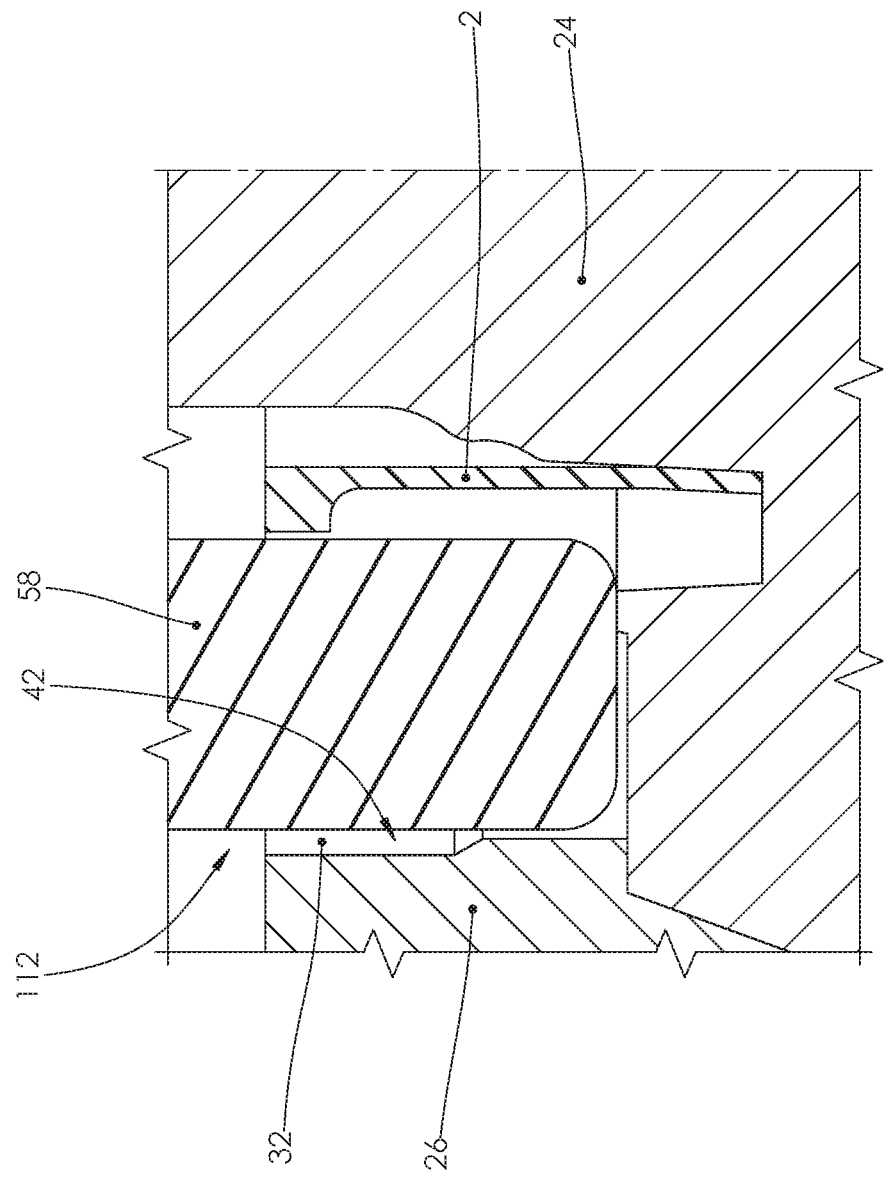
FIG. 8 is a fragmentary, longitudinal cross-sectional view of another preferred embodiment of a mold for compression molding of the seal, showing a liner and a preform inserted in the mold.

Description of FIG. 8

Referring now to the fragmentary longitudinal cross-section of FIG. 8, one of the previously mentioned examples of an appropriate molding process for forming the rotary seal is illustrated: compression molding. In compression molding, the mold collar 26 is installed onto the mold core 24, and then elastomer 58, in the un-vulcanized condition, is prepared as a preform 112. The preform 112 is inserted into the mold cavity 32 such that part of the preform 112 is located radially between the liner 2 and the collar cavity surface 42. The mold cap (not shown) is then installed on top of the preform 112, and the mold is inserted into a heated press that forces the mold cap to a closed position. The closing of the mold cap and the thermal expansion of the elastomer 58 produce the necessary molding pressure to form the liner 2 to the shape of the cavity surfaces of the mold core 24, and to vulcanize the elastomer 58 and bond the elastomer 58 to the liner 2.

Figure 9:
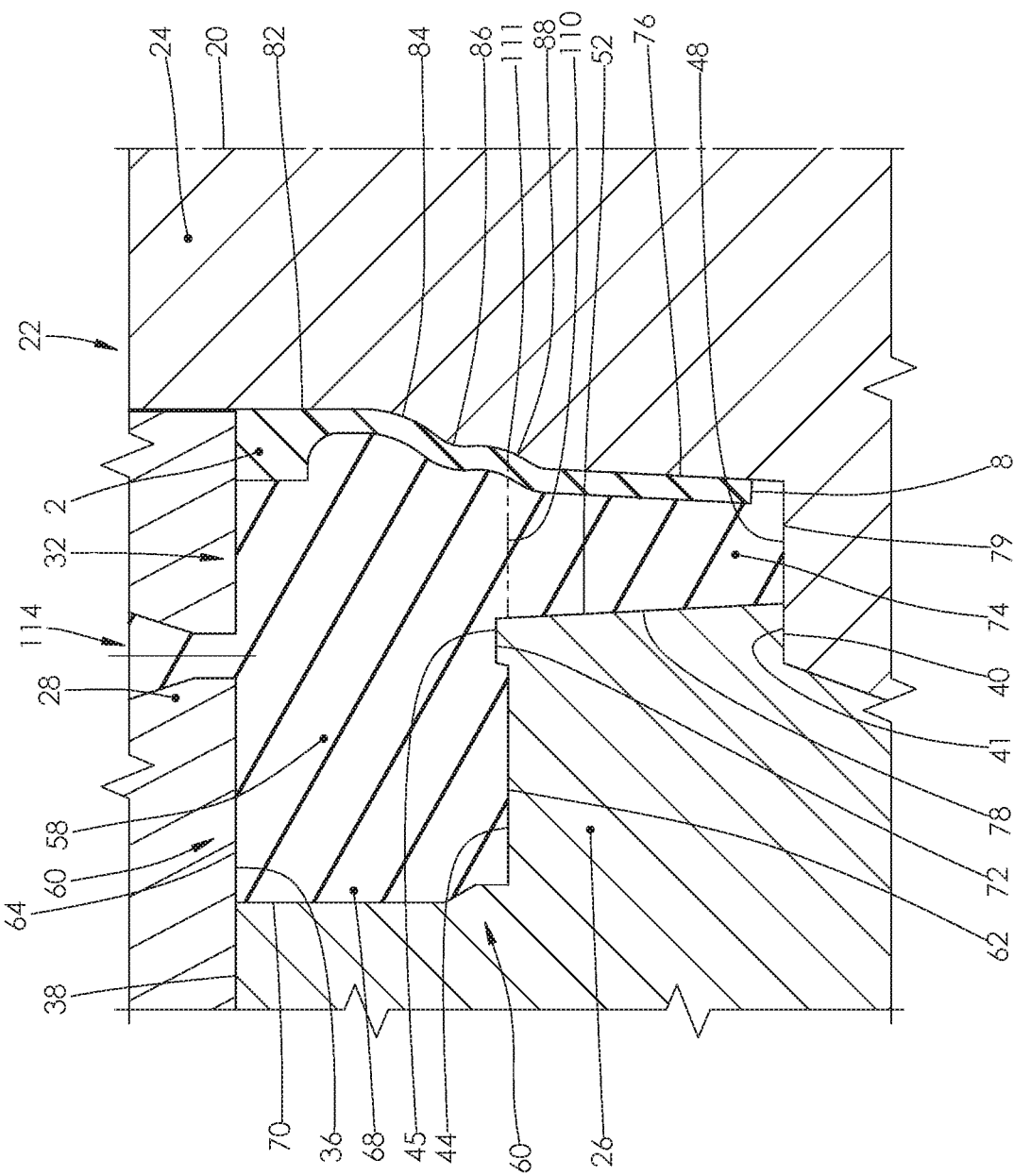
FIG. 9 is a fragmentary, longitudinal cross-sectional view of another preferred embodiment of a mold which provides for easier demolding, is also used for transfer molding, showing the mold in a closed position with a liner and elastomer within the mold cavity.

Description of FIG. 9

Referring now to the fragmentary longitudinal cross-section of FIG. 9, another of the previously mentioned examples of an appropriate molding process for forming the rotary seal 60 is illustrated: transfer molding. FIG. 9 also shows another preferred embodiment of the mold 22, where the interface between the mold core 24 and mold collar 26 provides for easier demolding, compared to the mold illustrated in FIGS. 2, 3, 4, 5, and 8.

In FIG. 9, the mold cap 28 has a series of sprues 114 through which the elastomer 58 is introduced into the mold cavity 32 in the un-vulcanized state, where temperature and the pressure of the molding process forms the liner 2 to the desired shape, bonds the elastomer 58 to the liner 2, and cures the elastomer 58 to a vulcanized state. The un-vulcanized elastomer 58 can be forced through the sprues by any suitable method. For example, one transfer molding method is to place a charge of uncured elastomer in a "pot", and then using the axial motion of a piston to force the elastomer 58 through the sprues 114 and into the mold cavity 32. The piston is typically driven by the movable, heated platen of a rubber molding press. Another transfer molding method called "pot-less transfer molding" involves placing a slab of uncured elastomer on the top of the mold cap 28, then placing the mold between the heated platens of a rubber press, and then using the movable platen of the press to force the un-vulcanized elastomer through the sprues 114 and into the mold cavity 32.

In FIG. 9, the mold shoulder 44, raised cavity surface 45, and outer groove wall 52 portions of the mold cavity 32 are defined by the mold collar 26, rather than by the mold core 24, and the locating surface 41 of the mold core 24 that faces and adjoins the collar shoulder 40 is a portion of the cavity groove end 48, rather than a portion of the mold shoulder 44. Although FIG. 9 illustrates the mold 22 as a transfer mold, the same mold configuration, without the sprues 114, is suitable for compression molding.

Compared to the mold configuration illustrated in FIGS. 2, 3, 4, 5, and 8, the mold configuration of FIG. 9 allows for easier demolding. First, the mold cap 28 is lifted axially away from the mold core 24 and the mold collar 26. If the mold is a transfer mold, this step tears the elastomer within the sprues 114 from the rotary seal 60. Second, the mold collar 26 is lifted axially away from the mold core 24. As the mold collar 26 is lifted and separated from the mold core 24, the mold shoulder 44 acts against the lubricant end 62 of the rotary seal 60, lifting the rotary seal 60 from engagement with the mold core 24. Lastly, the rotary seal 60 is lifted axially away from the mold collar 26.

It can be appreciated that the axial distance between the cap wall 36 and the mold shoulder 44 controls the position of the lubricant end 62 of the rotary seal relative to the environment end 64 and various other features of the seal. In FIG. 9, the mold shoulder 44 is positioned at the axial location that is most appropriate for conveniently manufacturing the type of rotary seal that is illustrated in FIGS. 1A, 1B, 1C, 1D, 1E, 1F, 1H, and 1J of commonly assigned Patent Application Publication No. US 2018/0335146 A1. In other words, when the machining operation cuts the axial extension 74 away to leave a machined seal surface 110 (which is illustrated with a phantom line in FIG. 9 herein) that is substantially level with the molded lubricant end 62, the machined seal surface 110 will intersect and adjoin the multi-function edge 88 at a radially undulating inner body corner 111, providing the rotary seal 60 with the pressure capability benefit described in Patent Application Publication No. US 2018/0335146 A1. The aforementioned radial undulation is due to the skew of the multi-function edge 88, and the sloping aspect of the ramp section of the multi-function edge 88. In other words, the machining operation may, if desired, truncate a portion of the dynamic lip 80.

In other words, if desired, the machined seal surface 110 may be adjacent to, truncate, and form an inner body corner 111 with the multi-function edge 88, such that the machined seal surface 110 has a radial depth that varies and the inner body corner 111 undulates in a radial direction. Preferably, the machined seal surface 110 and the inner body corner 111 are substantially parallel to the environment end 64 of the seal. If the machined seal surface 110 forms an inner body corner 111 with the multi-function edge 88, then the radial distance between the relief groove surface 72 and the inner body corner 111 varies around the rotary seal 60.

It can also be appreciated that the axial distance between the cap wall 36 and the mold shoulder 44 can, in the FIG. 9 arrangement of the mold 22, be located at an axial position that produces the same length of rotary seal 60 that is illustrated in FIGS. 6 and 7 herein. Since the mold collar 26 typically incorporates circular lathe-machined surfaces it is relatively economical to manufacture, compared to the mold core, which has complex surfaces that typically require surface milling to manufacture. This means that the FIG. 9 mold arrangement can economically have more than one mold collar 26, with each specific mold collar 26 producing a rotary seal 60 having a different axial length between the lubricant end 62 and the environment end 64. This provides a significant economic advantage over the mold arrangement shown in the mold configuration illustrated in FIGS. 2, 3, 4, 5, and 8 herein, where an additional expensive mold core 24 would have to be provided in order to have the capability of producing a rotary seal 60 having an alternate axial length between the lubricant end 62 and environment end 64. The finished rotary seal 60 preferably is composed of polymer, and preferably comprises the liner 2 and the vulcanized elastomer 58.

In FIG. 9, the theoretical axis 20, static lip 68, static sealing surface 70, relief groove surface 72, inward surface 76, extension end surface 79, dynamic sealing surface 82, dimple flank 84, dimple 86, and outward surface 78 are labeled for orientation purposes. Preferably, the dynamic sealing surface 82 adjoins the environment end 64.

NOMENCLATURE LIST liner 2
liner inner surface 4
liner outer surface 6
first liner end surface 8
second liner end surface 10
rim 12
rim outer surface 14
rim flank surface 16
fillet 18
theoretical axis 20
mold 22
mold core 24
mold collar 26
mold cap 28
wall angle 30
mold cavity 32
pilot surface 34
cap wall 36
collar end surface 38
collar shoulder 40
locating surface 41
collar cavity surface 42
body forming surface 42A
static lip forming surface 42B
flank forming surface 42C
mold shoulder 44
raised cavity surface 45
cavity groove 46
cavity groove end 48
inner groove wall 50
outer groove wall 52
lip forming surface 54
flank forming surface 54A
dimple forming surface 54B
edge forming surface 54C
periphery forming surface 54D
elastomer 58
rotary seal 60
lubricant end 62
environment end 64
body outer surface 66
static lip 68
static sealing surface 70
lip flank 71
relief groove surface 72
relief groove 73
axial extension 74
inward surface 76
outward surface 78
extension end surface 79
dynamic lip 80
dynamic sealing surface 82
dimple flank 84
dimple 86
multi-function edge 88
external corner 90
seal machining fixture 92
holder 94
clamp 96
axial directions 98
clamping surface 100
reaction surface 102
pilot surface 104
clamp guide surface 106
machining tool 108
machined seal surface 110
inner body corner 111
elastomer preform 112
sprue holes 114
Conclusion In view of the foregoing it is evident that the present invention is one that is well adapted to attain all the aspects and features hereinabove set forth, together with other aspects and features which are inherent in the apparatus disclosed herein.

Even though specific rotary seal and machining fixture geometries are disclosed in detail herein, other geometrical variations employing the basic principles and teachings of this invention are possible.

The foregoing disclosure and description of the invention are illustrative and explanatory thereof, and various changes in the size, shape and materials, as well as in the details of the illustrated construction, may be made without departing from the spirit of the invention. The present embodiment is, therefore, to be considered as merely illustrative and not restrictive, the scope of the invention being indicated by the claims rather than the foregoing description, and all changes which come within the meaning and range of equivalence of the claims are therefore intended to be embraced therein.

I claim:

1. A method for producing a seal, comprising:
(a) providing a mold (22) for producing an annular polymeric seal (60), the mold (22) comprising:
   a mold core (24) comprising:
      a lip forming surface (54) of annular form and facing in a generally radially outward direction;
      an inner groove wall (50) of annular form facing in a generally radially outward direction;
      a cavity groove end (48) having at least a portion thereof facing in a generally axial direction,
      the inner groove wall (50) located in axially intermediate relation to the lip forming surface (54) and the cavity groove end (48), and the lip forming surface (54) radially recessed relative to the inner groove wall (50);
   a mold cap (28) having a cap wall (36) of annular form facing in a generally axial direction toward the cavity groove end (48), the lip forming surface (54) located in axially intermediate relation to the cap wall (36) and the inner groove wall (50) and located in axially intermediate relation to the cap wall (36) and the cavity groove end (48);
   a mold collar (26) having a collar cavity surface (42) of annular form facing generally radially inward toward and surrounding at least a portion of the lip forming surface (54);
   one of the mold collar (26) and the mold core (24) having a mold shoulder (44) of annular form facing in a generally axial direction toward the cap wall (36), at least a portion of the collar cavity surface (42) located in axially intermediate relation to the mold shoulder (44) and the cap wall (36) and at least a portion of the lip forming surface (54) located in axially intermediate relation to the mold shoulder (44) and the cap wall (36);
   one of the mold collar (26) and the mold core (24) having an outer groove wall (52) of annular form facing radially inward toward and surrounding at least a portion of the inner groove wall (50), at least a portion of the outer groove wall (52) located in axially intermediate relation to the cavity groove end (48) and the mold shoulder (44), and the outer groove wall (52) located in axially intermediate relation to the cavity groove end (48) and the cap wall (36); and
   the cavity groove end (48), the inner groove wall (50), and the outer groove wall (52) defining a cavity groove (46) for forming an axial extension (74) of a polymeric seal (60);
(b) providing a plastic liner (2) of annular form, the plastic liner (2) having first and second liner end surfaces (8, 10) facing in generally opposite axial directions and having a liner inner surface (4) and a liner outer surface (6) facing in generally opposite radial directions and located in axially intermediate relation to the first and second liner end surfaces (8, 10);
(c) installing the plastic liner (2) on the mold core (24) with a portion of the liner inner surface (4) facing toward and surrounding at least a portion of the inner groove wall (50) and with a portion of the liner inner surface (4) facing toward and surrounding at least a portion of the lip forming surface (54) and with a portion of the liner outer surface (6) encircled by the mold shoulder (44);
(d) after step (c) introducing an elastomer (58) between the liner outer surface (6) and the collar cavity surface (42) and applying pressure and temperature to vulcanize the elastomer (58) and remold the liner inner surface (4) to the shape of the lip forming surface (54);
(e) using the mold (22) to produce an annular polymeric seal (60) having:
   a lubricant end (62) and an environment end (64) facing in generally opposite, generally axial directions and separated by a distance, the lubricant end (62) facing generally away from the environment end (64);
   an inward surface (76) of annular form facing in a generally radially inward direction;
   an axial extension (74) of annular form extending axially beyond the lubricant end (62) and formed at least in part from the inward surface (76) and having an outward surface (78) facing in a generally radially outward direction away from the inward surface (76) and encircling at least a portion of the inward surface (76), the outward surface (78) located in radially intermediate relation to the inward surface (76) and the lubricant end (62);
   a dynamic lip (80) of annular form projecting radially inward relative to the inward surface (76) and having a dynamic sealing surface (82) of annular form facing in a generally radially inward direction;
   a liner (2) of annular form composed of plastic defining the dynamic sealing surface (82), the axial extension (74) located in radially intermediate relation to the dynamic sealing surface (82) and the lubricant end (62); and
(f) removing at least a portion of the axial extension (74) by a machining operation, producing a machined seal surface (110) facing in a generally axial direction away from the environment end (64) and located in radially intermediate location to the lubricant end (62) and the dynamic sealing surface (82).

2. A method for producing a seal, comprising:
(a) providing an annular seal (60) having:
   a lubricant end (62) and an environment end (64) facing in generally opposite, generally axial directions and separated by a distance, the lubricant end (62) facing generally away from the environment end (64);
   a static sealing surface (70) facing in a radially outward direction and adjoining the environment end (64);
   an inward surface (76) of annular form facing in a generally radially inward direction;
   an axial extension (74) of annular form extending axially beyond the lubricant end (62) and away from the environment end (64) and formed at least in part from the inward surface (76) and having an outward surface (78) facing in a generally radially outward direction away from the inward surface (76) and encircling at least a portion of the inward surface (76), the outward surface (78) located in radially intermediate relation to the inward surface (76) and the lubricant end (62);
   a dynamic lip (80) of annular form projecting radially inward relative to the inward surface (76) and having a dynamic sealing surface (82) of annular form facing in a generally radially inward direction, the dynamic sealing surface (82) adjoining the environment end (64),
   wherein the environment end (64) is a generally planar surface extending between the dynamic sealing surface (82) and the static sealing surface (70); and
   a liner (2) of annular form composed of plastic defining the dynamic sealing surface (82), the axial extension

(74) located in radially intermediate relation to the dynamic sealing surface (82) and the lubricant end (62); and (b) removing at least a portion of the axial extension (74) by a machining operation, producing a machined seal surface (110) facing in a generally axial direction away from the environment end (64) and located in radially intermediate location to the lubricant end (62) and the dynamic sealing surface (82).

3. The method of claim 2, wherein a portion of the machined seal surface (110) is formed by the liner (2).

4. The method of claim 2, wherein the machining operation removes a portion of the liner (2).

5. The method of claim 2, wherein the machining operation truncates a portion of the dynamic lip (80).

6. The method of claim 2, wherein the machined seal surface (110) is substantially even with the lubricant end (62).

7. The method of claim 2, wherein the machined seal surface (110) is separated from the environment end (64) by a distance, and the distance separating the machined seal surface (110) from the environment end (64) is substantially the same as the distance separating the lubricant end (62) from the environment end (64).

8. The method of claim 2, wherein prior to the machining operation the outward surface (78) is located radially outward of and encircles at least a portion of the liner (2).

9. The method of claim 2, wherein prior to the machining operation the lubricant end (62) is located radially outward of and encircles at least a portion of the liner (2).

10. The method of claim 2, wherein the liner (2) forms at least part of the environment end (64).

11. The method of claim 2, wherein prior to the machining operation a relief groove surface (72) is located in radially intermediate relation to the axial extension (74) and the lubricant end (62) and at least part of the relief groove surface (72) is located in axially intermediate relation to the lubricant end (62) and the environment end (64),
wherein the relief groove surface (72) intersects and adjoins the outward surface (78) of the axial extension (74).

12. The method of claim 11, wherein the relief groove surface (72) is located radially outward of and encircles a portion of the inward surface (76).

13. The method of claim 2, wherein the annular seal further comprises a relief groove (73) located in radially intermediate relation to the lubricant end (62) and the axial extension (74) and radially outward of and encircling a portion of the liner (2), and at least part of the relief groove (73) located in axially intermediate relation to the lubricant end (62) and the environment end (64).

14. The method of claim 2, wherein prior to the machining operation the lubricant end (62) is located radially outward of and encircles a portion of the inward surface (76) and a portion of the liner (2).

15. The method of claim 2, wherein a relief groove surface (72) is located in radially intermediate relation to the machined seal surface (110) and the lubricant end (62) and at least part of the relief groove surface (72) is located in axially intermediate relation to the lubricant end (62) and the environment end (64).

16. A method for producing a seal, comprising:
(a) providing a mold (22) for producing an annular polymeric seal (60), the mold (22) comprising a mold core (24), a mold cap (28) and a mold collar (26),
wherein the mold core (24), mold cap (28) and mold collar (26) have surfaces defining a mold cavity (32) comprising:
a lip forming surface (54) of annular form adjoining an inner groove wall (50) of annular form, the lip forming surface (54) and inner groove wall (50) facing in a generally radially outward direction and the lip forming surface (54) radially recessed relative to the inner groove wall (50);
a cavity groove end (48) joining an end of the inner groove wall (50), at least a portion of the cavity groove end (48) facing in a generally axial direction;
a cap wall (36) of annular form facing in a generally axial direction toward the cavity groove end (48);
a mold shoulder (44) of annular form facing in a generally axial direction toward the cap wall (36);
a collar cavity surface (42) of annular form facing generally radially inward toward and surrounding at least a portion of the lip forming surface (54);
an outer groove wall (52) of annular form facing radially inward toward and surrounding at least a portion of the inner groove wall (50); and
the cavity groove end (48), the inner groove wall (50), and the outer groove wall (52) defining a cavity groove (46) for forming an axial extension (74) of a polymeric seal (60);

(b) providing a plastic liner (2) of annular form having first and second liner end surfaces (8, 10) facing in generally opposite axial directions and having a liner inner surface (4) and a liner outer surface (6) facing in generally opposite radial directions and located in axially intermediate relation to the first and second liner end surfaces (8, 10), (c) installing the plastic liner (2) on the mold core (24) with the first liner end surface (8) adjoining the cavity groove end (48), a portion of the liner inner surface (4) facing generally radially inward toward and encircling at least a portion of the inner groove wall (50), and a portion of the liner inner surface (4) facing generally radially inward toward and encircling at least a portion of the lip forming surface (54);

(d) after installing the plastic liner (2) on the mold core (24) with the first liner end surface (8) adjoining the cavity groove end (48), introducing an elastomer (58) between the liner outer surface (6) and the collar cavity surface (42) and applying pressure and temperature to vulcanize the elastomer (58) and remold the liner inner surface (4) to the shape of the lip forming surface (54);

(e) producing an annular polymeric seal (60) having:
a lubricant end (62) shaped by the mold shoulder (44);
an environment end (64) shaped by the cap wall (36);
an axial extension (74) of annular form extending axially beyond the lubricant end (62) and shaped at least in part by the inner and outer groove walls (50, 52) and the cavity groove end (48);
an inward surface (76) of annular form facing in a generally radially inward direction and shaped by the inner groove wall (50); and
a dynamic lip (80) of annular form projecting radially inward relative to the inward surface (76) and having a dynamic sealing surface (82) of annular form facing in a generally radially inward direction and formed by the liner inner surface (4); and (f) removing at least a portion of the axial extension (74) by a machining operation, producing a machined seal surface (110) facing in a generally axial direction away from the environment end (64) and located in radially intermediate location to the lubricant end (62) and the dynamic sealing surface (82).

17. The method of claim 16, wherein the machining operation truncates a portion of the dynamic lip (80).

18. The method of claim 16, wherein a portion of the machined seal surface (110) is formed by the liner (2).

19. The method of claim 16, wherein the machining operation removes a portion of the liner (2).

20. The method of claim 16, wherein the machined seal surface (110) is substantially even with the lubricant end (62).

21. The method of claim 16, wherein the machined seal surface (110) is separated from the environment end (64) by a distance, and the distance separating the machined seal surface (110) from the environment end (64) is substantially the same as the distance separating the lubricant end (62) from the environment end (64).

22. The method of claim 16, wherein prior to the machining operation the lubricant end (62) is located radially outward of and encircles at least a portion of the liner (2).

23. The method of claim 16, wherein the liner (2) forms at least part of the environment end (64).

24. The method of claim 16, wherein the annular seal further comprises a relief groove (73) located in radially intermediate relation to the lubricant end (62) and the axial extension (74) and radially outward of and encircling a portion of the liner (2), and at least part of the relief groove (73) located in axially intermediate relation to the lubricant end (62) and the environment end (64).

25. The method of claim 16, wherein prior to the machining operation the lubricant end (62) is located radially outward of and encircles a portion of the inward surface (76) and a portion of the liner (2).

26. The method of claim 16, wherein a relief groove surface (72) is located in radially intermediate relation to the machined seal surface (110) and the lubricant end (62) and at least part of the relief groove surface (72) is located in axially intermediate relation to the lubricant end (62) and the environment end (64).

* * * * *